(12) United States Patent
Katrycz

(10) Patent No.: US 10,245,762 B2
(45) Date of Patent: Apr. 2, 2019

(54) METHOD AND SYSTEM FOR INTEGRATING BRANCHED STRUCTURES IN MATERIALS

(71) Applicant: Charles Wasyl Katrycz, York (CA)

(72) Inventor: Charles Wasyl Katrycz, York (CA)

(*) Notice: Subject to any disclaimer, the term of this patent is extended or adjusted under 35 U.S.C. 154(b) by 214 days.

(21) Appl. No.: 15/048,420

(22) Filed: Feb. 19, 2016

(65) Prior Publication Data
US 2016/0243738 A1 Aug. 25, 2016

Related U.S. Application Data

(60) Provisional application No. 62/118,312, filed on Feb. 19, 2015, provisional application No. 62/118,715, filed on Feb. 20, 2015.

(51) Int. Cl.

| | | |
|---|---|---|
| *B29C 45/17* | (2006.01) | |
| *B29C 39/02* | (2006.01) | |
| *B29C 39/00* | (2006.01) | |
| B29L 31/00 | (2006.01) | |
| B29K 105/00 | (2006.01) | |

(52) U.S. Cl.
CPC .......... *B29C 39/021* (2013.01); *B29C 39/003* (2013.01); *B29K 2105/0094* (2013.01); *B29L 2031/00* (2013.01)

(58) Field of Classification Search
CPC .. B29C 39/003; B29C 39/021; B29C 45/1703
See application file for complete search history.

(56) References Cited

U.S. PATENT DOCUMENTS

2013/0319575 A1* 12/2013 Mendyk ................ A61J 1/1475
 141/1
2015/0157831 A1* 6/2015 Crall ..................... A61M 25/10
 604/103.1

FOREIGN PATENT DOCUMENTS

WO WO 9314735 A1 * 8/1993 ................ A61J 1/10

* cited by examiner

*Primary Examiner* — James Sanders
(74) *Attorney, Agent, or Firm* — Gilbert's LLP; Matthew D. Powell

(57) ABSTRACT

A device for producing branched structures is provided which includes an enclosed cell enclosed by two sheets with a port in at least one of the sheets and an injection device connected to the port. The enclosed cell may also include a boundary joining the two sheets. A method is also provided for producing branched structures, wherein fluids of differing viscosities are injected into an enclosed cell and the fluid of lower viscosity branches into the fluid of higher viscosity. The branching of the fluid can be modified using contoured or textured surfaces of the enclosed cell, injecting or evacuating the fluids during branch formation, or impressing a stencil or stamp over a surface of the enclosed cell.

14 Claims, 16 Drawing Sheets

METHOD AND SYSTEM FOR INTEGRATING BRANCHED STRUCTURES IN MATERIALS

CROSS-REFERENCE TO RELATED APPLICATIONS

This application claims the benefit of provisional patent applications U.S. 62/118,312, filed Feb. 19, 2015 and U.S. 62/118,715, filed Feb. 20, 2015, respectively, by the present inventor.

FIELD OF INVENTION

This application relates to methods and devices to produce branched structures, specifically to the use of viscous fingering to produce branching patterns in curable compounds.

BACKGROUND

Branching processes can be seen all around us. Branching geometry provides free standing trees, plumbing and electricity in buildings, electric current through branched wiring, and lightening fractures through the air in dendrites. Our lungs breathe air in to be absorbed by branching bronchioles and alveoli, which cover an enormous surface of over 100 $m^2$. On that surface gases are exchanged to our branching blood vessels to be carried to and from our cells. Our extraordinary branched circulatory system reaches all of our cells, but itself is a small fraction of our body's volume.

While there are innumerable examples of the value of branching to distribute fluid, provide structural support, optimize surface area to volume ratio, etc., the formation of branched structures is tedious. Biology often uses branched channel pathways to distribute fluid to surfaces. By comparison, our own manufacturing methods are inefficient.

As an example, NASA's Liquid Cooling and Ventilation Garment is designed to circulate coolant to the surface of the human body. It achieves this by snaking 48 individual tubes of a combined length of over 90 meters through a fabric garment in a serpentine pattern. The many manifolds required are cumbersome, as is the hosing. The process of manufacturing these suits has changed little since the Apollo mission, and involves the tedious sewing of the tubing into the garment.

Another method is currently used to produce branched channels in silicone for head cooling caps to prevent hair loss in chemotherapy patients. It involves the creation of a master mold, the casting of two separate membranes, and the lamination of the two membranes to close the channels. It is a time intensive process.

Another method currently makes use of 3D printing to create branched channels. Indeed, 3D printing is able to produce bodies with embedded hollow channel networks in a single print. However, this is a time intensive process, with each "voxel" of material needing to be added in series. It is highly limited to materials, and ill-suited to rapidly produce customized channel networks in a soft, wearable material.

It is the natural propensity of less viscous fluids to branch, when forced into more viscous fluids, while constrained to a quasi-two-dimensional space. This is a process known as viscous fingering. By controlling the geometry of that space, one can control the pressure gradients that dictate the growth of branched channels.

Viscous fingering has been studied as an experimental process since 1958. The process has been investigated by science laboratories studying pattern formation. Most of the literature describes various physical characteristics of the fluid flow within Hele-Shaw cells.

In a study entitled *Self-Patterned Growth of Branched Structures in Non-Curing and in Curable Structures via Electro-Hydrodynamic Hele-Shaw Flow*, Drexel University (2009), an applied electrical field was used to control the branching of channels in a curable medium. This method limits the use of viscous fingering to a subclass of dielectric host fluids and conductive guest fluids. It hampers rapid customization of channel geometry by using electrodes to direct and stabilize channel growth.

Another study entitled, *A practical method for patterning lumens through ECM hydrogels via viscous finger patterning*, J. Lab. Automation (2012) does not take advantage of the branching. Instead, the tunneling process is used to hollow out pre-made tubular forms and leave a coating with a biomimetic lumen texture. This application lacks a self-organizing fluidic process that is controllable and compatible with design.

It has been of interest to investigate the phenomenon of viscous fingering for the purpose of increasing yields in oil well extraction. CN 104268401 (A) provides a method for simulating the fluidic process in a porous medium and analytical systems used in researching the viscous fingering of fractured acidification construction in an oil field. In the art of oil well extraction, viscous fingering is a phenomenon that is sought to be reduced, rather than employed in useful contexts.

A version of the fluidic process has been used to produce a unique identifying mark for the purposes of security, DE 102012010482, (A1) 2012, and similarly to produce a structured coating in WO2007030952 (A1), 2007. However, neither of these inventions discloses a method to create closed channel structures out of the fluidic process. For this reason, they fail to realize the full potential of the branched-pattern formation process.

A melt stretching process KR20140043740 (A)—2014 makes use of randomly distributed drops of liquid plastics to build random reinforcement between laminar sheets. However, this process falls short of an ability to design and control the growth of channel building processes into intentionally shaped branched systems.

The fractal properties of the viscous fingering phenomenon offer many unique and valuable applications. Whereas it is often of great value to create a fractal distribution of matter (in flow pipes CN104806489, (A) 2015, in antennas CN103311663 (A)—2013, in heat exchangers CN101932899 (A)—2010, and spreading structures JP2007022171 (A)—2007) the methods for manufacturing such structures are not designed with this end goal in mind. Methods for entrenching fractal channels may involve casting molds, connecting pipes, CNC milling, 3D printing, laser etching, electrical discharge machining, photolithography, and the like, but none of these methods is capable of rapidly building an enclosed branched-channel network. Thus there is a need for an efficient and cost-effective system and method to produce branched structures with practical applications using a process known as viscous fingering.

SUMMARY

A further understanding of the functional and advantageous aspects of the disclosure can be realized by reference to the following detailed description and drawings.

An object of the present invention is to provide systems and methods for producing branched structures.

Thus by one broad aspect, a device is provided for producing branched structures comprising a first sheet having an inner surface and an outer surface, a second sheet having an inner surface and an outer surface, wherein the second sheet inner surface faces the first sheet inner surface, a port connected to the first sheet, and an injection device connected to the port.

By another broad aspect, a method is provided for a device for producing branched structures comprising a first sheet having an inner surface and an outer surface, a second sheet having an inner surface and an outer surface, wherein the second sheet inner surface faces the first sheet inner surface, a boundary connecting the inner surface of the first sheet and the inner surface of the second sheet, a port connected to any of the first sheet, the second sheet or the boundary and an injection device connected to the port.

By another broad aspect of the present invention, the invention provides a method for producing branched structures comprising injecting a first fluid, having a first viscosity, between a first sheet and a second sheet facing the first sheet, injecting a second fluid, having a second viscosity lower than the first viscosity, at least once between the first sheet and the second sheet, such that the second fluid channels into the first fluid in a branched pattern, setting at least one of the first fluid and the second fluid to form a branched structure; and removing at least one of the first sheet and the second sheet to release the branched structure.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. The section headings used herein are for organizational purposes only and are not to be construed as limiting the subject matter described.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

Using the methods and apparatus here disclosed, great programmability can be achieved over the growth of branching structures. For example, form fitting cooling garments can be rapidly produced to custom fit the user; water purifying systems can be made affordably and locally to purify drinking water in rural communities affected by water-borne disease; complex pneumatic actuators may be produced both by amateur hobbyists and professional soft robotics builders.

Medical device manufacturing may also benefit. The process can make fluid delivery systems directly into medical grade silicones. This removes risk of contamination with solvents and adhesives present in other casting methods. Minimal materials are wasted because the process doesn't involve cutting material away. Seamless bladders may be produced, to create high-fidelity channels within a single material.

EXAMPLE 1

Figure 1:
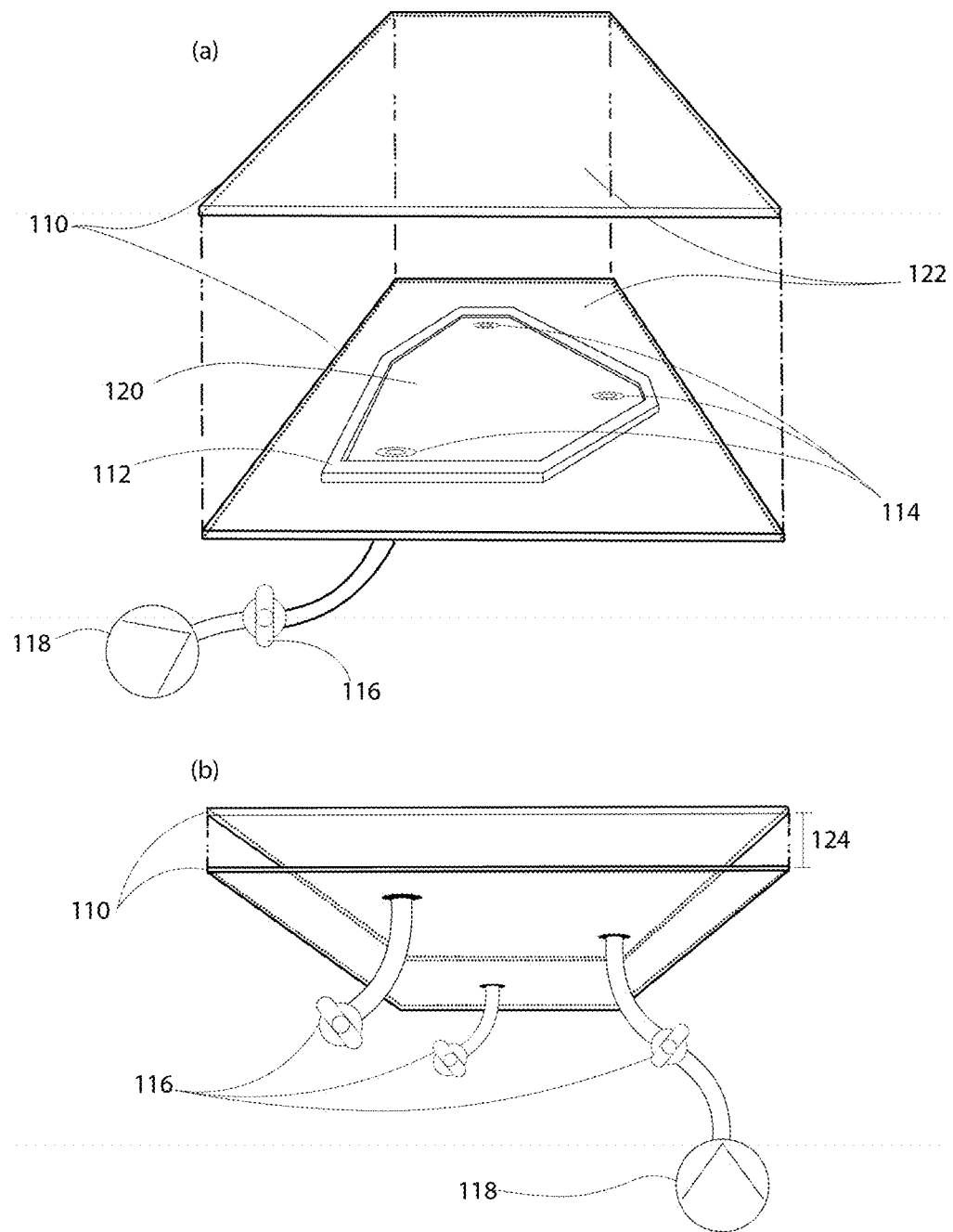
FIG. 1 is a perspective view of a first embodiment of a system for producing branched channel structures.

FIG. 1 depicts a perspective view of one embodiment of a system assembly used in creating channel structures. FIG. 1 illustrates the first embodiment where sheets 110 sandwich a boundary 112 to enclose a cell space 120. The gap height 124 is a dynamic quantity measured by the distance between the sheets' 110 surfaces 122 at a given location. Valves 116 connect to hoses which connect to ports, here, referred to as sources/sinks 114, to allow fluid into and out of the cell 120. The valves 116 control the flow of fluid between injection and evacuation to and from the cell 120.

Sheets 110 are arranged to enclose a boundary 112. This arrangement creates a contained cell space 120. The cell space 120 is a quasi-two-dimensional space confined by the surfaces 122 of the sheets 110 and the boundary 112. The cell 120 has a gap height 124 that allows for the cell 120 to have volume. The gap height 124 is small in relation to its other dimensions, so the space is considered quasi-two-dimensional. Only sources and sinks 114, also referred to as ports, allow access to the space. Valves 116 and injection devices 118 control the flow of a first fluid 126, also referred to as host fluid, and a second fluid 128, also referred to as guest fluid, to and from the cell 120. The second fluid 128 has a lower viscosity than the first fluid 126.

Figure 4:
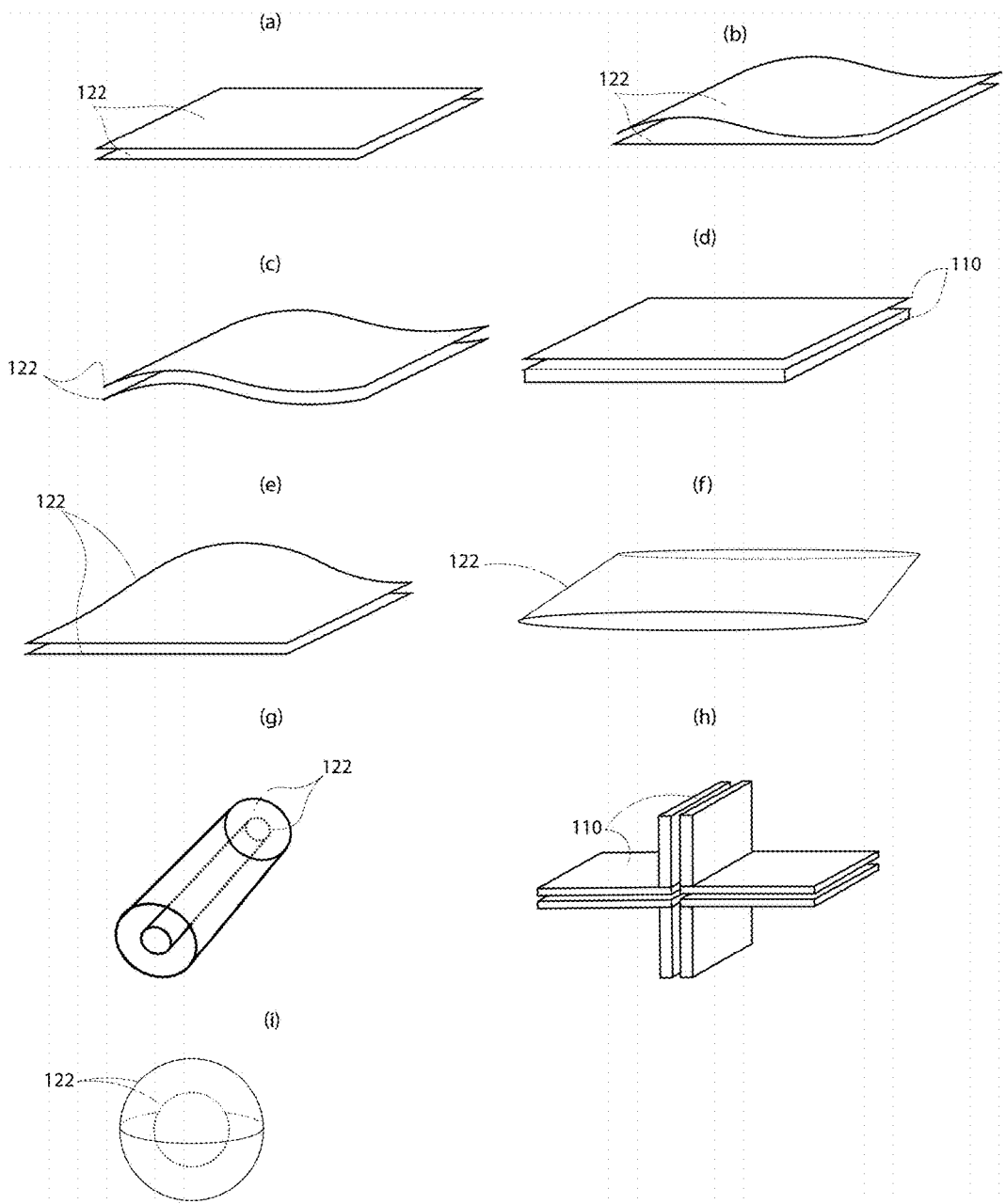
FIG. 4 illustrates various embodiments of contoured and flat sheet surfaces.

Arrangements:

FIG. 4 illustrates various contoured and flat surfaces 122 on sheets 110 varying in rigidity. In (a), surfaces 122 are parallel and flat. In (b), surfaces 122 are nonparallel and one surface 122 is contoured. In (c) both surfaces 122 are contoured and run parallel to each other. In (d) sheets 110 of different thicknesses are shown. In (e), one surface 122 is contoured and deformable. In (f), a surface 122 connects to itself in a loop. In (g) surfaces 122 are coaxial cylinders. In (h) sheets 110 intersect at angles. In (i) surfaces 122 are concentric spheres.

Sheets 110 may be rigid or flexible, flat or contoured, malleable, deformable, hard or soft, thick or thin, etc. They may be made from plastic, acrylic, glass, wood, vinyl, fiber board, rubber, etc. The sheets 110 may be uniform or vary in these attributes. The sheets 110 need not share the same physical properties. The sheets 110 may be cast into the shape of a body part or other contoured surface. As discussed in more detail below, the sheets 110 may lay parallel, to maintain a constant gap height 124, or may vary as desired to vary the gap height 124. The sheets 110 may permit visible light to pass through. If UV curable fluids are being used, at least one of the sheets 110 should allow the transmission of UV light. Depending on the composition of the host fluid 126 and guest fluid 128, a release agent may be required to be applied to the surfaces 122 of the sheets 210, and sources/sinks 114.

Returning to FIG. 1, the boundary 112 is made of a material that can be used to seal the cell 120. This material may be compressible and impermeable to gases and liquids. Examples include closed cell foams such as weather stripping and double-sided outdoor adhesive tapes, rubber and silicone gaskets, cork sheets, etc. As described further below and illustrated in FIG. 5, the boundary 112 can be arranged in any shape; circle, square, hand outline, etc. The boundary 112 can be closed or have opening(s) that function as sources/sinks 114 and there can be multiple boundaries 112, as described further below. Pillars connecting the surfaces 122 can be considered multiple boundaries 112. The boundary 112 combines with the surfaces 122 to define the overall shape of the cell 120. One embodiment of a boundary is double sided outdoor adhesive tape. The adhesion between the surfaces 112 to both top and bottom of the boundary ensures contact to the surfaces 122 of the sheets 110 and an air tight cell 120.

One or both sheets 110 and/or the boundary 112 can contain one or more sources/sinks, ports, holes, or gaps 114. Sources/sinks refer to ports that allow fluids to enter or leave the space enclosed by the two sheets 110. The sources/sinks 114 may lay flush with the surface 122. The source/sinks 114 may be distributed on the surface 122 in any arrangement and in any number. The cell 120 requires at least one source/sink 114 to allow fluids access to the space. If there is a source/sink 114 in the boundary 112 then no source/sink 114 is required in the surface 122, and vice versa.

Valves 116 may be connected by way of tubing or hosing or other fluid conducting channel types to the sources/sinks 114. Valves 116 may be of various types including generic valves, check valves, three-way valves, etc. Every source/sink 114 should be connected to a valve 116 or other means of controlling flow through said source/sink 114.

Injection and Evacuation devices 118 may comprise syringes or pumps, with a reservoir for containing fluids, and a means of moving it to and from the cell 120 by way of sources/sinks 114. A single cell 120 may be connected to multiple injection and evacuation devices 118.

The cell space, or cell volume, or cell 120, is a quasi-two-dimensional enclosure defined by the surfaces 122, and boundary 112. The cell 120 is accessed by way of sources/sinks 114. The cell 120 can be of fixed volume, or its volume can change, by changing the boundary 112 position or gap height 124. The cell 120 structure defines the space that fluids are able to access.

Figure 8:
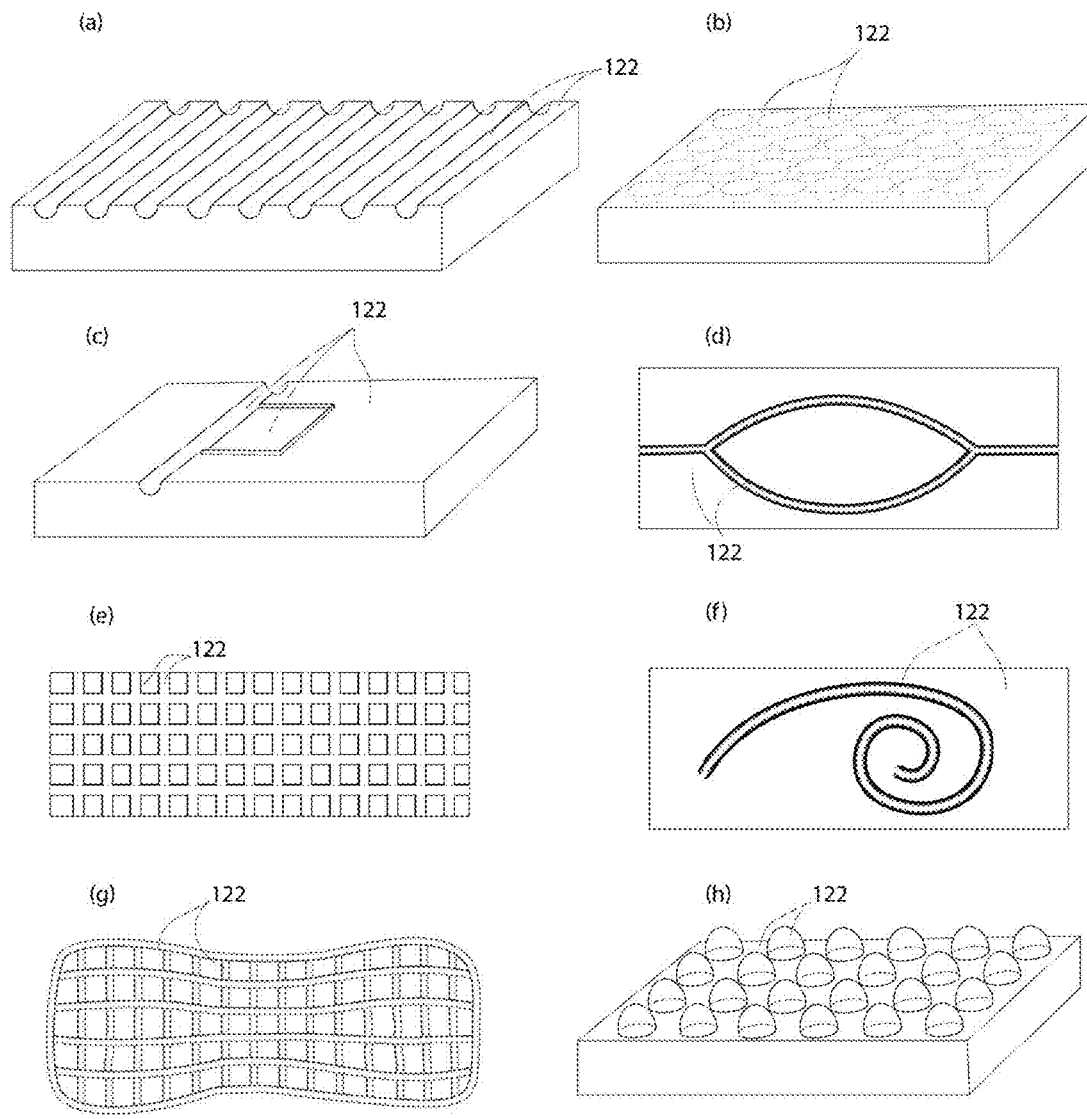
FIG. 8 illustrates embodiments of surfaces used in the production of branched channel structures.

The surface 122 refers to the face of the sheets 110 that contains the host 126 and guest 128 fluids. The surface 122 combines with the boundary 112 to define the cell 120. The surface 122 can be smooth rough, or textured, as illustrated further in FIG. 8. The texture may be grooves, bumps, pillars, etc. and may be patterned, regular or irregular.

The gap height 124 is defined by the normal (or shortest) distance between the enclosing surfaces 122 of the cell 120. The gap height 124 may be constant through the entirety of the cell 120 or may vary. The gap height 124 may be equal to the height provided for by the boundary 112 in separating the surfaces 122. The gap height 124 may also vary in space and time throughout the process.

A first fluid 126, referred to as the host fluid, is any fluid of a higher viscosity relative to the second fluid 128, also referred to as the guest fluid. Examples of host fluid 126 include liquid silicone, molten plastic, molten glass, molten metal, glycerin, agar, etc., and may include colloidal mixtures, gels, elastomers, porous media, Newtonian and non-Newtonian fluids, be homogeneous or heterogeneous, contain particles, etc. The host fluid(s) 126 may be able to solidify through curing or freezing, or by other means. The host fluid 116 may cure only at its interface with the guest fluid 128, or it may cure in its entirety. The host fluid 126 may be a Newtonian, non-Newtonian, shear thinning, and/or shear thickening fluid. It may contain surfactants or other chemicals or particulate additives to provide desired flow and interface effects.

A second fluid 128, referred to as the guest fluid, is any fluid of a lower viscosity relative to the host fluid 126 injected into the cell 120. Guest fluid(s) 128 may be able to solidify through curing or freezing, or by other means. It may cure only at its interface with the host fluid 126, or it may cure in its entirety. Guest fluid 128 may be Newtonian, non-Newtonian, shear thinning, or shear thickening, foams, gels, elastomers, liquid silicones, molten plastic, molten glass, molten metal, glycerin, agar, etc. It may contain surfactants or other chemical or particulate additives to provide desired flow and interface effects.

The overall function of sheets 110 is to constrain the flow of host fluid 126 and guest fluid 128 to the quasi-two-dimensional cell 120. The sheets 110 may also influence the flow of said fluids. By moving the sheets 110 apart and increasing the gap height 124, in full or in part of the cell 120, low pressure zones are created, which draw fluids toward them like a vacuum. The guest fluid 128 is injected under pressure, and the flexibility/mutability of the sheets 110, combined with the mutability of the boundary 112, and the drainage of fluid from the cell 120, accommodates the new volume of material entering the cell 120. The sheets 110 accommodate the guest fluid 128 and allow it to move through the host fluid 126 without building up excessive amounts of pressure. This allows for controlled growth of branched channels.

Figure 5:
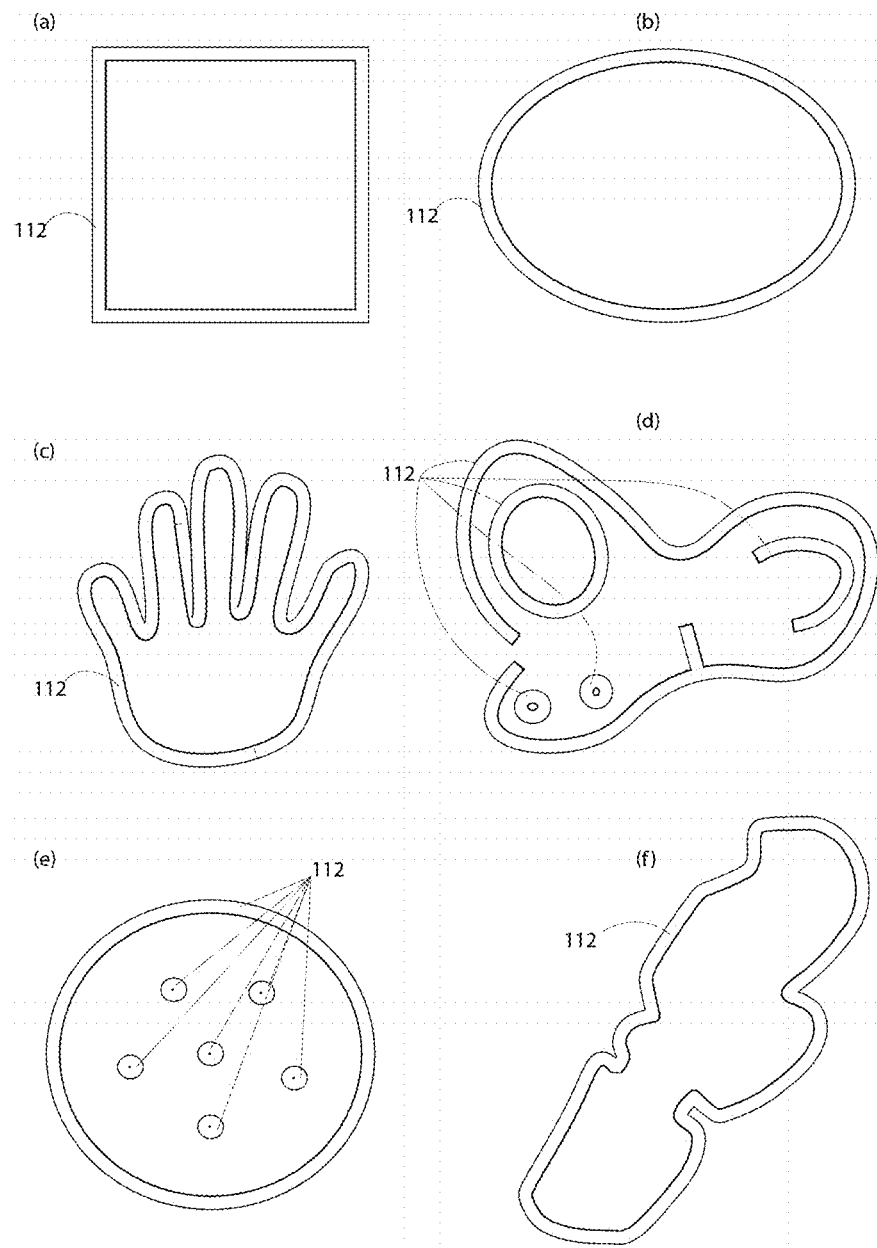
FIG. 5 illustrates various embodiments of a boundary.

The boundary 112 constrains the lateral motion of the fluids 126, 128 within the cell 120. FIG. 5 illustrates various arrangements of the boundary 112. It is important to ensure the integrity of the cell space 120 by ensuring that the boundary 112 and surfaces 122 are well sealed from unwanted leaks. Should the boundary 112 or surface 122 leak, the leak will become a source/sink 114 and will result in diminished control over the growth process. The boundary 112 must provide adequate contact with the surfaces 122 to prevent leaks from occurring. The boundary 112 also contributes to the gap height 124 by separating surfaces 122. The compressibility/stretchability of the boundary 112 can be used to adjust the gap height 124 as required, through external or internal forcing of the sheets 110. Multiple boundaries 112 may be used to create void spaces within the final product, as would be the case using the boundary 112 arrangement, as depicted in FIG. 5(d).

Returning again to FIG. 1, the sources/sinks 114 allow access of the host 126 and guest 128 fluids to the cell 120. Their arrangement is used to influence the flow of fluids within the cell 120. A single source/sink 114 can function as either an entry, and/or exit of fluid to the cell 120. When a source/sink 114 is used to drain fluid from the cell 120, it is functioning as a sink. When a source/sink 114 is used to supply the cell 120 with fluid, it is functioning as a source.

Valves 116 control when a source/sink 114 is active, and what fluid flows through it. Injection device 118 can provide positive or negative pressure to a reservoir of fluid to move it to or from the sources/sinks 114 of the cell 120. Transport can be done through any number of fluid conducting channels. The injection device 118 may function as a pump and also as an evacuation device, providing negative pressure and drawing fluid from the cell 120. Examples of such injection devices include a syringe, piston, peristaltic pump, hydraulic pump, air compressor, paint spray tank, etc.

The cell space 120 provides the overall containment of the fluids. It should be designed to the size and shape specified by the application in question. Channel structures will be created within the cell 120 through the injection process, as described below and illustrated in FIG. 9. The cell 120 functions as a casting cavity, containing the fluids under some degree of pressure during injection or post injection to preserve the fidelity of the branched channels. Using sheets 110 that have contours, or where sections on sheets 110 have a normal vector that is not aligned parallel to gravity, can result in drifting of host 126 and guest 128 fluids within the cell 120. This can be mitigated by ensuring the host 126 or guest 128 fluids have a high enough resistance to flow when under pressure within the cell 120.

The surfaces 122 of the sheets 110 are a modifiable interface that interacts with the fluids. The surfaces 122 are the closest elements of the sheets 110 to the host 126 and guest 128 fluids. The texture of the surfaces 122 influences flow behavior. Grooves in the surface may be used to bias the branching pattern along the direction of the grooves. For example, an equilateral triangular grid of grooves will bias the branching angle of channels to 60 degrees. Branch channels will be biased to run along grooves. By creating rectangular groove grids in surface 122 as in FIG. 8(e), channels can be grown to branch at 90 C. Grooves, recessed and protruding faces can be incorporated in the surface 122 to channel fluid motion and control growth of branched channels in desired arrangements.

The gap height 124 influences the branched channel width. Channel width is related to gap height through the following equation:

$$\lambda_c = \pi b \sqrt{\frac{\sigma}{\mu V}} \quad (1)$$

Here $\lambda_c$ is known as the instability length or capillary length (small capillary length means small channel width), b is the gap thickness of the cell, V is the velocity of the interface, $\sigma$ is the interfacial tension, and $\mu$ is the difference between the viscosities of the two fluids.

By controlling the gap height 124, through deformation of the sheets 110, entrenching grooved textures, creating recessed or protruding faces in the surfaces 122, or otherwise, great control over channel size can be achieved. The gap height 124 will also determine the resistance to flow, where the smaller the gap height, the higher the resistance. Since the fluid will travel through the path of least resistance, branched channel growth will propagate most rapidly in grooved or recessed regions, where the gap height 124 is highest, and resistance to flow is lowest.

Host fluid 126 provides the medium into which the guest fluid 128 can branch. It is injected into the cell 120 to fill space. The host fluid 126 may be moved by pressure gradients into and out of the cell through sources/sinks 114. This fluid motion creates dynamic zones within the cell 120, and can aid in the control of branched channel growth during injection of guest fluid 128. The flow of host fluid 126 in the cell 120 can be used to guide the guest fluid 128 through the branched channel growth process, as depicted in FIG. 12(a).

The guest fluid 128 is injected into the host fluid 126. The fluids interact along pressure gradients created by injection of host 126 and guest 128 fluids, or by deformation of the cell 120 through external force applied to the sheets 110. The guest fluid 128 branches into the host fluid 126 through the process of viscous fingering.

Assembling the System

Figure 9:
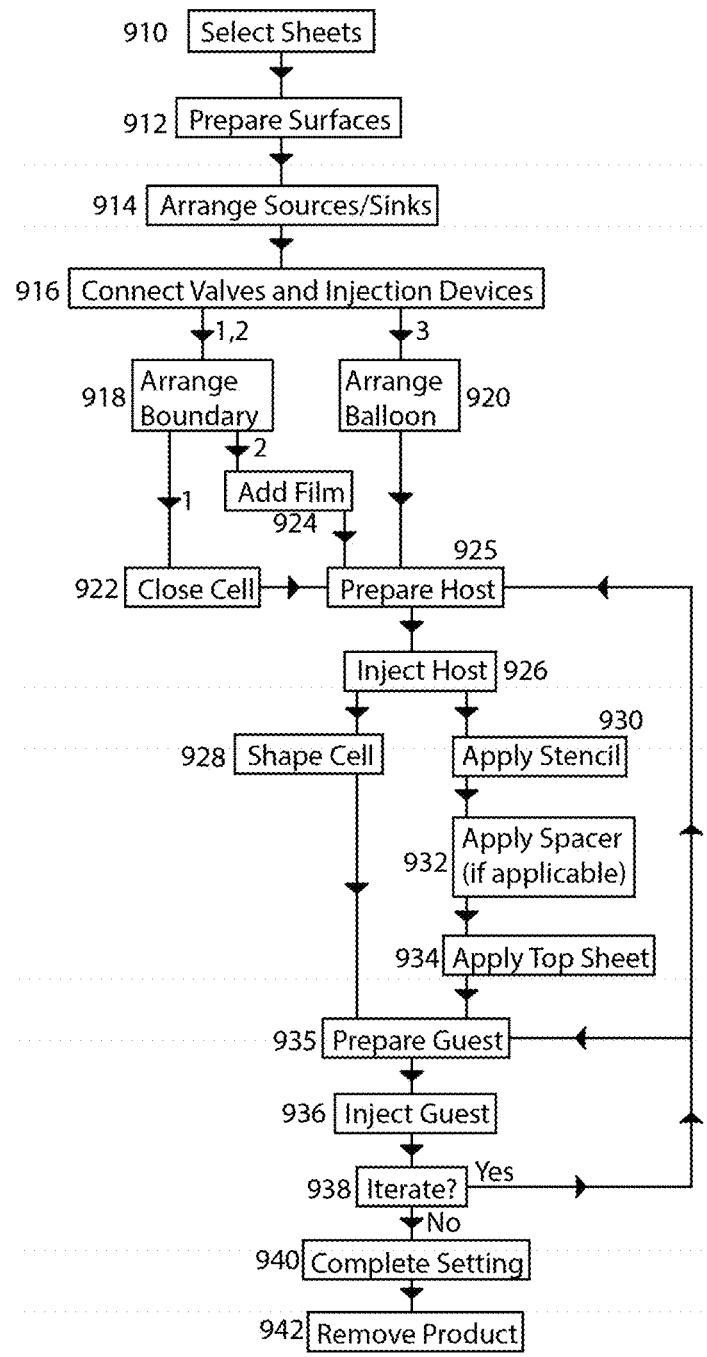
FIG. 9 depicts a flow diagram of the various stages in the operations of embodiments.

FIG. 9 depicts a flow diagram of the various stages in the operations of embodiments 1,2,3. The numbers 1,2, and 3 in FIG. 9 placed beside arrows indicate the corresponding embodiment. Further, the use of the term Sources/Sinks 114 throughout this disclosure refers to ports which may be used as either inlets or outlets for fluid.

The design of cell 120 is determined by the product that is to be created. The various aspects of the system, as illustrated in FIG. 1 should be arranged with an end product in mind.

Sheet Selection

Flexible/Mutable

Figure 15:
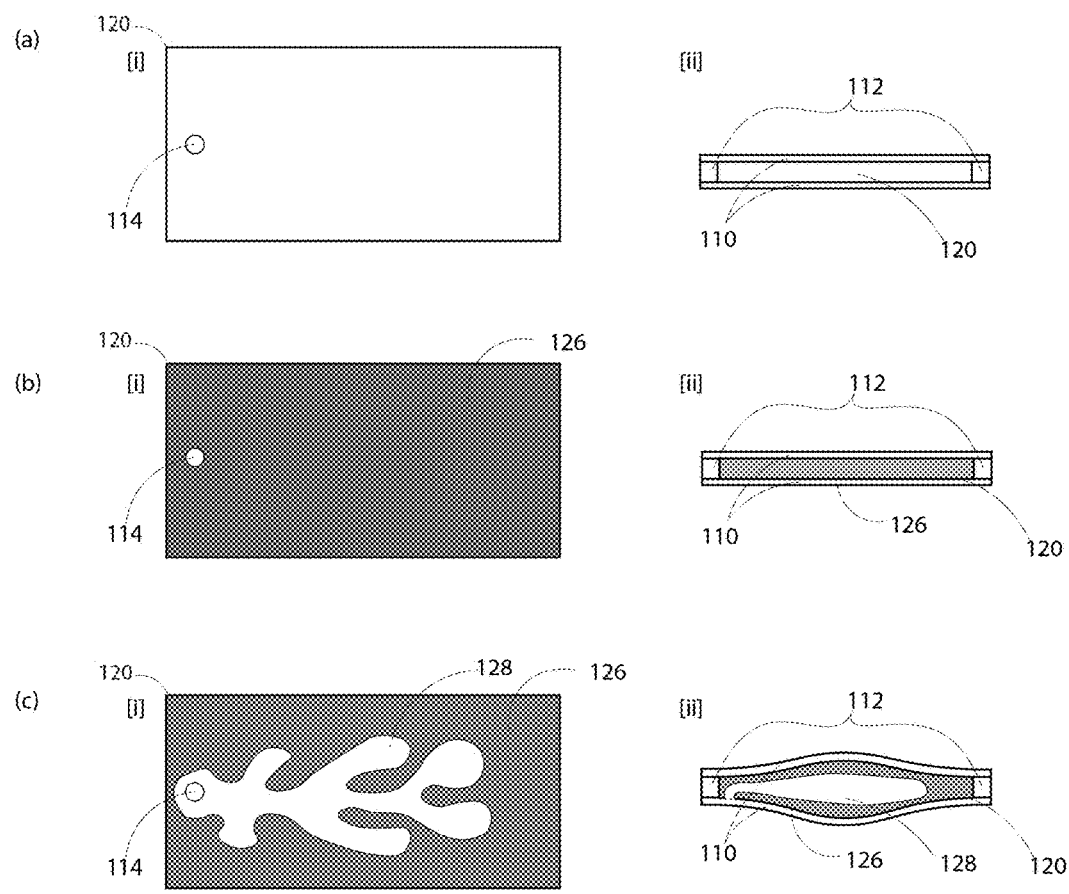
FIG. 15 illustrates the injection process of guest and host fluid in three stages.

The sheets 110 may be selected so as to allow for their controlled deflection when the cell 120 becomes pressurized. For example, this could occur when guest fluid 128 is injected into host fluid 126 in the cell 120 through a source/sink 114, as in FIG. 15(c). The outward deflection of the sheets 110 increases the gap height 124 and the volume of the cell 120. FIG. 15(c)[ii] illustrates a cross section of the cell 120 after guest fluid 128 injection. If the sheets 110 are too malleable, flexible, or soft, the injection of guest fluid 128 can cause an undesirable gap height 124 in parts of the cell 120. Care should be taken in calculating the desired gap height based on the fluid parameters and channel width described in equation 1. The desired gap height 124 should then be engineered into the cell 120 by accounting for the working pressures and the physical characteristics of the sheet 110 materials and boundary 112. The deflection of the sheets 110 can be simulated in a Computer Aided Design environment, to help with material selection and to adjust physical parameters.

Rigid/Immutable

Figure 16:
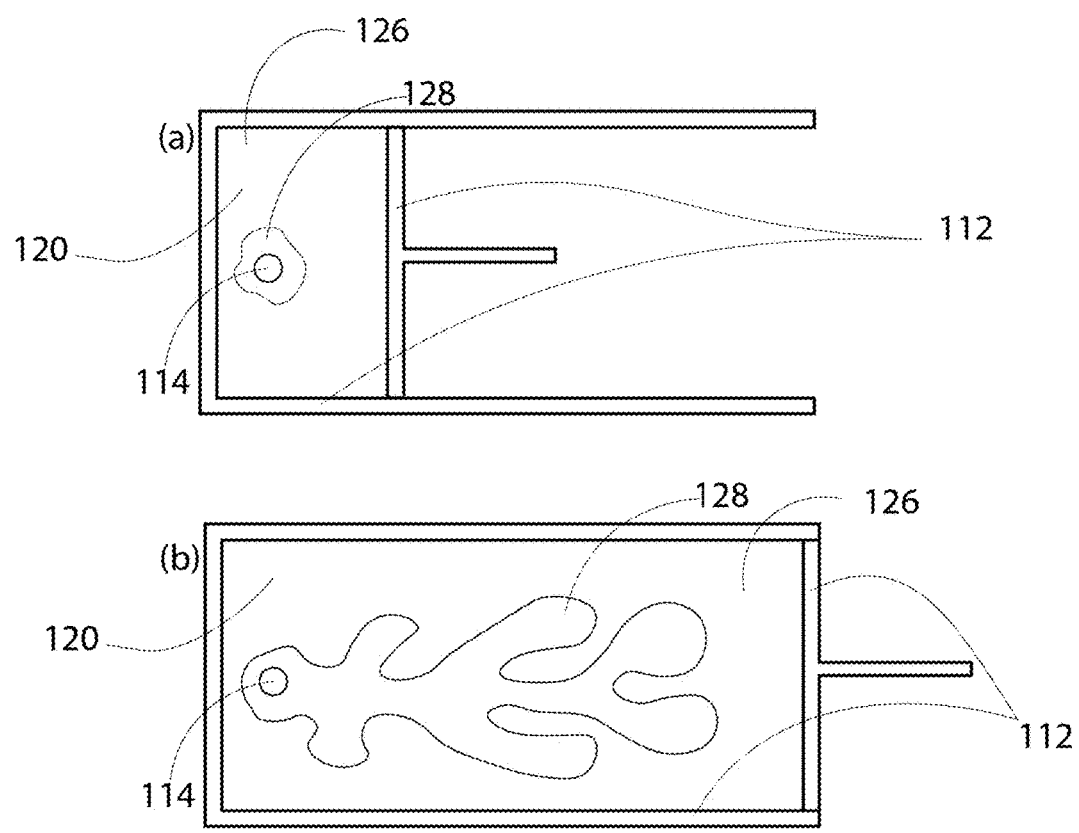
FIG. 16 illustrates an embodiment of a cell with a sliding boundary.

The sheets 110 may be desired to remain rigid under pressure. If the sheets 110 are rigid, the pressure required to introduce guest fluid 128 into the cell 120 may be larger than in flexible sheet 110 systems. Systems comprising rigid sheets 110 require either the use of sources/sinks 114 to drain host fluid 126 to accommodate the introduction of guest fluid 128 to the cell 120 or a dynamic boundary 112. The volume of the cell 120 can be changed to accommodate guest fluid 128 using a dynamic boundary 112 comprised of stretchable or foldable materials, sliding gaskets etc. A sliding boundary 112 is illustrated in FIG. 16. The cell 120 is filled with host fluid 126 while the boundary 112 limits the cell 120 size. Host fluid 128 is partially injected through a source/sink 114. The moveable portion of the boundary 122 then slides right to increase the size of the cell 120. This draws in guest fluid 128 and accommodates the injection by creating additional volume. Using a dynamic boundary 112 can also achieve a change in gap height 124 between the rigid sheets 110. Stretchable boundaries 112 can be used to allow pressure in the cell 120 to increase the volume of the cell 120 and accommodate guest fluid 128. This can also be used to draw guest fluid 128 into the cell 120, by separating the sheets 110 using external means (e.g. pulling the sheets apart with suctions cups).

Surface Preparation

Surfaces 122 should be textured based on the intended design of the channels. For example, in rigid sheet 110 systems, channel branch angle is easily controlled by etching grooves in a grid at the desired angles and on the same scale as the desired branch channel width, as in FIG. 8e. FIG. 8a, b, c, h illustrates some examples of texture variations including grooves, divots, recessed faces on the surfaces 122 of sheets 110. The grooves should be of comparable size to the desired channel width (see equation 1). This element of control can be introduced in flexible sheet 110 systems as well. Recessed faces as in FIG. 8a and FIG. 8c in the surface 122 can be another way of changing the branch channel width, as recessed faces will increase the gap height 124.

Source/Sink Arrangement

Figure 7:
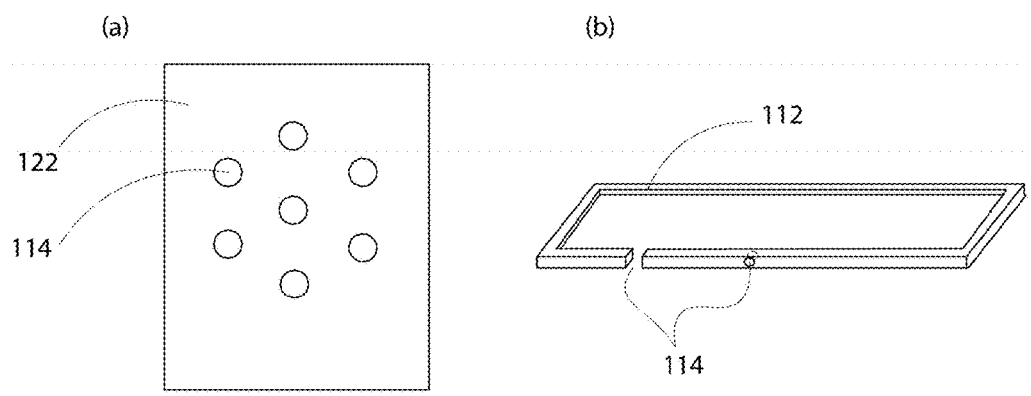
FIG. 7 illustrates possible arrangements of ports on a sheet or in a boundary.
Figure 12:
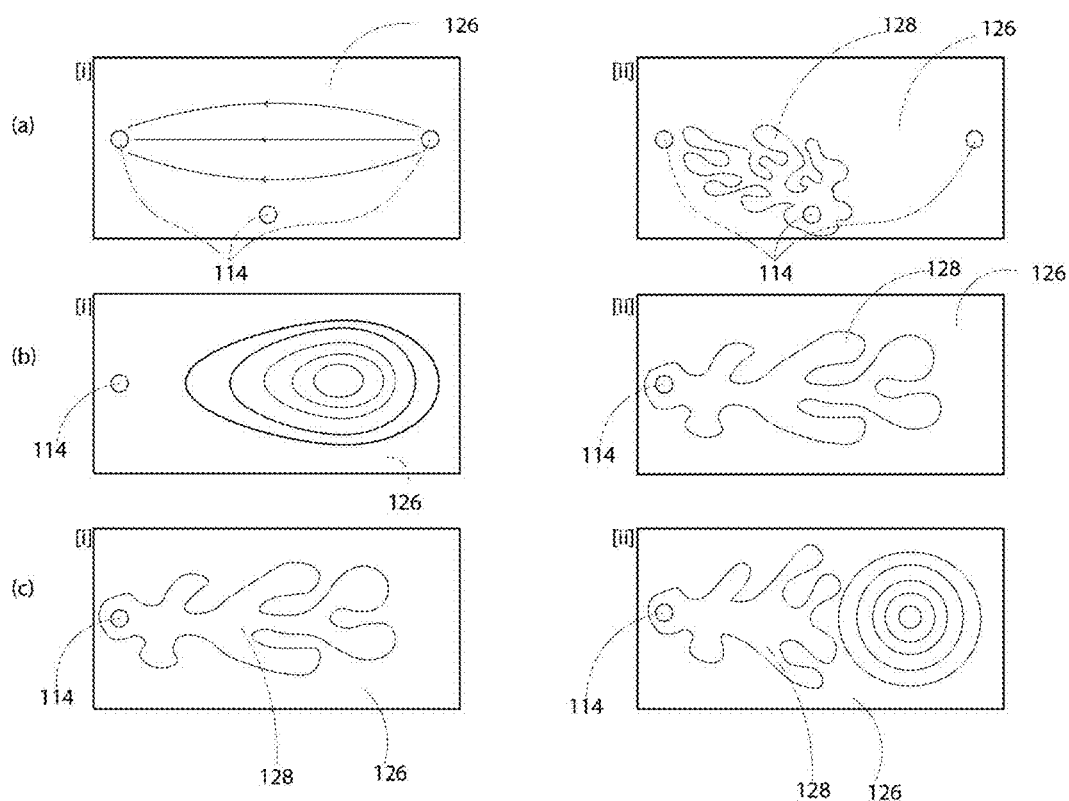
FIG. 12 illustrates various methods of guiding the growth of guest fluid channels within the cell.

FIG. 12 illustrates various methods of guiding the growth of guest fluid 128 channels within the cell 120. Using the flow of host fluid 126 currents in (a[i]) the growth of channels (a[ii]) can be seen to follow a downstream path towards draining host fluid 126. Forcing the sheets 120 away from each other creates low pressure zones, depicted using gradient lines in (b[i]). Channel growth is attracted to low pressure zones (b[ii]). In (c[i]) channels have been established in the cell 120. In (c[ii]) channels are pushed out of high pressure zones, depicted using gradient lines, where the sheets 120 are being forced towards each other. FIG. 7 (a) illustrates one possible arrangement of the sources/sinks 114 on a surface 122.

The sources/sinks 114 should be arranged where channel origins and end points are desired. Channel origins will exist where guest fluid 128 is injected into the cell 120. Sources/sinks 114 can be used to direct growth towards them, by allowing host fluid 126 to leave the cell 120. Sources/sinks 114 can be used to inject host 126 fluid into the cell 120 to create currents in the cell 120, which will cause any growing channels to drift or avoid said sources/sinks 114. The layout of sources/sinks 114 will also depend on how the host fluid 126 will be injected to fill the cell 120 and to create currents to direct channel growth, as in FIG. 12(a).

Sources/sinks 114 can aid in filling the cell 114 with host fluid 126. By placing two sources/sinks 114 on opposite ends of the cell 120, host fluid 126 can be introduced through one source/sink 114, while air exits out the other, to fill the cell 120.

Injection and Evacuation Devices and Valve Connection

Each source/sink 114 should be connected to a valve 116 by a hose or other fluid conducting channel. This allows for opening and closing of sources/sinks 114. The valves 116 can also be connected to injection and evacuation devices 118, for example a syringe containing host 126 or guest 128 fluids.

Boundary Placement

The boundary 112 should be arranged in the shape of the article that is being produced. The height of the boundary 112 contributes to the gap height 124 within the cell 120. Physical aspects of the boundary, including stretchability, compressibility, and mutability in general, are important considerations as these will affect the gap height 124 as the cell 120 becomes pressurized. Additionally, the boundary should be made of an air-tight material to prevent unwanted leaks. The boundary 112 should be fixed in the outline of the article being produced. The boundary 112 should be fixed in such a way as to prevent it from slipping between the sheets 110 as the cell 120 becomes pressurized. Moving the boundary 112 to change the dimensions of the cell 120 can be used to accommodate fluids injected into the cell 120, as in FIG. 16. FIG. 16(a) shows guest fluid 128 in just beginning to be injected through a source/sink 114 into host fluid 126. The cell 120 grows as the boundary 112 slides. In FIG. 16(b) guest fluid 128 has been completely injected and the boundary 112 has slid to maximize the size of the cell. Sources/sinks 114 may also be introduced in the boundary 112, as in FIG. 7(b). The boundary 112 should be placed on either one of the sheets 110 in the desired arrangement.

Cell Closure

Sheets 110 should be brought together so that their surfaces 122 sandwich the boundary 112. They should be fixed together by the application of external clamps, screws, or by the adhesive properties of the boundary 112 (e.g. double sided adhesive tape). This should be done to a degree that prevents the possibility of unwanted leaks when fluids are injected under pressure into the cell 120.

Injecting Fluids

Host Fluid Preparation

The host fluid 126 should be prepared. If the host fluid 126 is desired to set and it is a molten material, it must be subjected to appropriate levels of heat to reach the desired temperature. The cell 120 may also require heating to maintain the host fluid 126 at a desired temperature. The cell 120 may be heated unevenly to produce variable viscosity of the host fluid 126 within the cell 120. For example, external heating could produce a trail of molten wax within solid wax, to guide the growth of branched channels. If it is a curable medium, the mixing of the compound should be completed thoroughly. Alternatively the host 126 fluid may be desired to react chemically with the guest fluid, or the host fluid 126 is desired to remain liquid throughout the process. The host fluid 126 may also be subjected to degassing in a vacuum chamber prior to injection.

Host Fluid Injection

The host fluid 126 should be injected to fill the cell 120. Air should be removed from the cell 120 through a source/sink 114. This can be done by injecting the host fluid 126 into the cell 120, and by applying pressure externally to the sheets 110 to compress the cell 120 and to force out air bubbles.

External Forcing; Cell Shaping

The sheets 110 may have become deformed by the pressure applied internally from the host fluid 126, as depicted in FIG. 11(a). If this is the case, the sheets 110 should be forced towards each other while an open valve 116 allows host fluid 126 to flow out of the cell 120 through a source/sink 114. This can be repeated until the sheets 110 are in their resting (relaxed) state FIG. 11(b), or it can be further repeated until the sheets 110 are deformed towards each other, as illustrated in FIG. 11(c). At that point, all valves 116 should be closed to the cell 120. The sheets 110 now produce a negative pressure on the host fluid 126. This will facilitate injection of a guest fluid 128, by drawing the guest fluid 128 into the host fluid 126.

If the sheet is sufficiently elastic and deformable, indentations may be made in a designed geometry. By applying external pressure to flexible and elastic sheets 110 with a valve 116 open, fluid leaves the cell 120. By closing the valve 116 negative pressure is generated around those deformations. Channels will fill this space first. As the elasticity returns the sheet 110 to neutral it will draw fluid towards the place where deformation occurred, as in FIG. 12(b). As well, placing an external force along the sheets 110 in a path while simultaneously injecting guest fluid 128 is a way of guiding the growth of channels through said path.

Guest Fluid Preparation

The guest fluid 128 should also be prepared. If it is quick to prepare the guest fluid 128 (e.g. compressed air) then this can be done after host fluid 126 is injected. If it takes longer to prepare, and the host fluid 126 requires immediate manipulation due to time sensitive physical and chemical characteristics, then the guest fluid 128 should be prepared simultaneously or prior to the host fluid 126. If the guest fluid 128 is desired to set and it is a molten material, it must be subjected to heat to reach the desired temperature. The cell 120 and the host fluid 126 may also require heating to maintain the guest fluid 128 at a desired temperature. If the guest fluid 128 is a curable medium, the mixing of the two-part compound should be completed thoroughly. Alternatively the guest fluid 128 may be desired to react chemically with the host fluid 126, or the guest fluid 128 may be desired to remain fluid throughout the process. The guest fluid 128 may also be subjected to degassing in a vacuum chamber prior to injection, as desired.

Guest Fluid Injection

Guest fluid 128 should be injected after the host fluid 126 has been injected and arranged within the cell 120. At this point the guest fluid 126 may be directed within the cell 120 through a source/sink 114. If an evenness of branched channel growth is desired, the guest fluid 128 should be injected smoothly. Short bursts of guest fluid 128 can also be used to create finer branches. Orderly channel growth will be achieved within a range of guest fluid 128 flow rate. This range is determined by the compositions of the fluids 126/128 and dimensions of the cell 120. To determine the ideal flow rate, the injection device 118 should be regulated to operate at adjustable pressures. This means, adjusting the pressure until the flow rate corresponds to the desired interface velocity as determined by equation 1. One should be cautious so as to not exceed the pressure limits of the cell 120, as this will cause leaks. After tuning the flow rate, the system should be refreshed. Guest fluid 128 can be drawn out of the cell 120, and if necessary, host fluid 126 re-injected. The guest 126 fluid injection process 936, in FIG. 9, may then be resumed. The pressure of the guest fluid 128 inside the injection device 118 can be larger than the capacity of the cell 120. This can allow for the desired flow rate to be achieved. Caution should be taken to ensure that the cell 120 itself does not reach an internal pressure greater than it can withstand. During the guest fluid 128 injection process 936 the cell 120 can be deformed to influence the growth of channels in a desired way.

External Forcing

Figure 11:
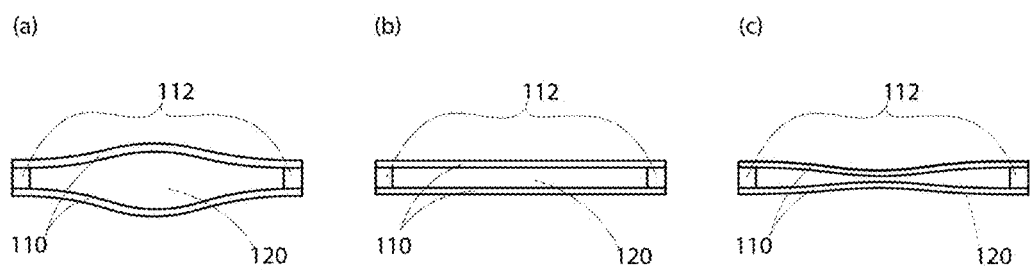
FIG. 11 illustrates a cross sectional view of possible embodiments of the cell assembly.

By applying an external force to the sheets 110, the cell 120 can be deformed, and the gap height 124 can be varied. When the cell 120 is deformed, the fluid within the cell 120 moves to conforms to the new shape of the cell 120. FIG. 11 illustrates sheets 110 connected by boundary 112 to create a cell 120. In (a) the sheets are separated to increase the cell 120 volume. In (b) the sheets 110 are in their neutral positions. In (c) the cell 120 is diminished in volume and the sheets 110 are close together. By applying crushing force to the sheets 110 one can create a zone within the cell 120 where the surfaces 122 are closer together and the gap height 124 is reduced. Fluid will be forced away from this zone, as in FIG. 12(c). By applying force to a zone of the sheets 110 in the opposite direction, the gap height 124 and cell 120 volume can be increased. This can draw channels into said zone. This can be achieved by making use of the elastic memory of the sheets 110. As illustrated in FIG. 12(b), a zone of indentation will draw channel growth into it when the sheets 110 return to their rest position. This will have the same effect as pulling the sheet apart with suction cups or equivalent means. Deformation of the sheets 110 can direct fluid towards or away from a zone within the cell 120. Increasing gap height 124 and cell volume 120 will draw fluid in. Decreasing gap height 124 and cell volume will force fluid out.

Simultaneous Host and Guest Fluid Injection

Host fluid 126 injection 926 may be repeated during guest fluid 128 injection 936. Host fluid 126 injected into, and draining from the cell 120 through sources/sinks 114 will create currents within the cell 120, as illustrated in FIG. 12(a)[i]. The current is a zone of bulk host 126 fluid motion (traveling right to left in FIG. 12(a)[i]). This can be used during/following guest fluid 128 injection to direct branched channel growth. The channels will grow away from sources of host fluid 126, and towards sinks of host fluid 126, as in FIG. 12(a)[ii].

Use of Valves

The channels of guest fluid 128 may grow rapidly into the host fluid 126. The valves 116 should be readily accessible or digitally controlled so that they can be adjusted to effect the flow of host 126 and guest 128 fluids within the cell 120. Shutting all valves 116 after the desired channel growth will ensure that the pressure is maintained within the cell 120, and that the channels retain their integrity. If a channel of guest fluid 128, such as air, is injected under pressure and is then allowed to reach a source/sink 114 in such a way as to come into contact with the atmosphere, the pressure within the cell 120 will drop rapidly to equilibrate with the atmosphere. This will cause the branched channels to shrink/recede. Dropping the pressure of the guest fluid 128 can be used to reduce the pressure in the cell 120, and shrink/recede the branching of the channels in the cell 120.

Design Completion or Iteration?

Figure 13:
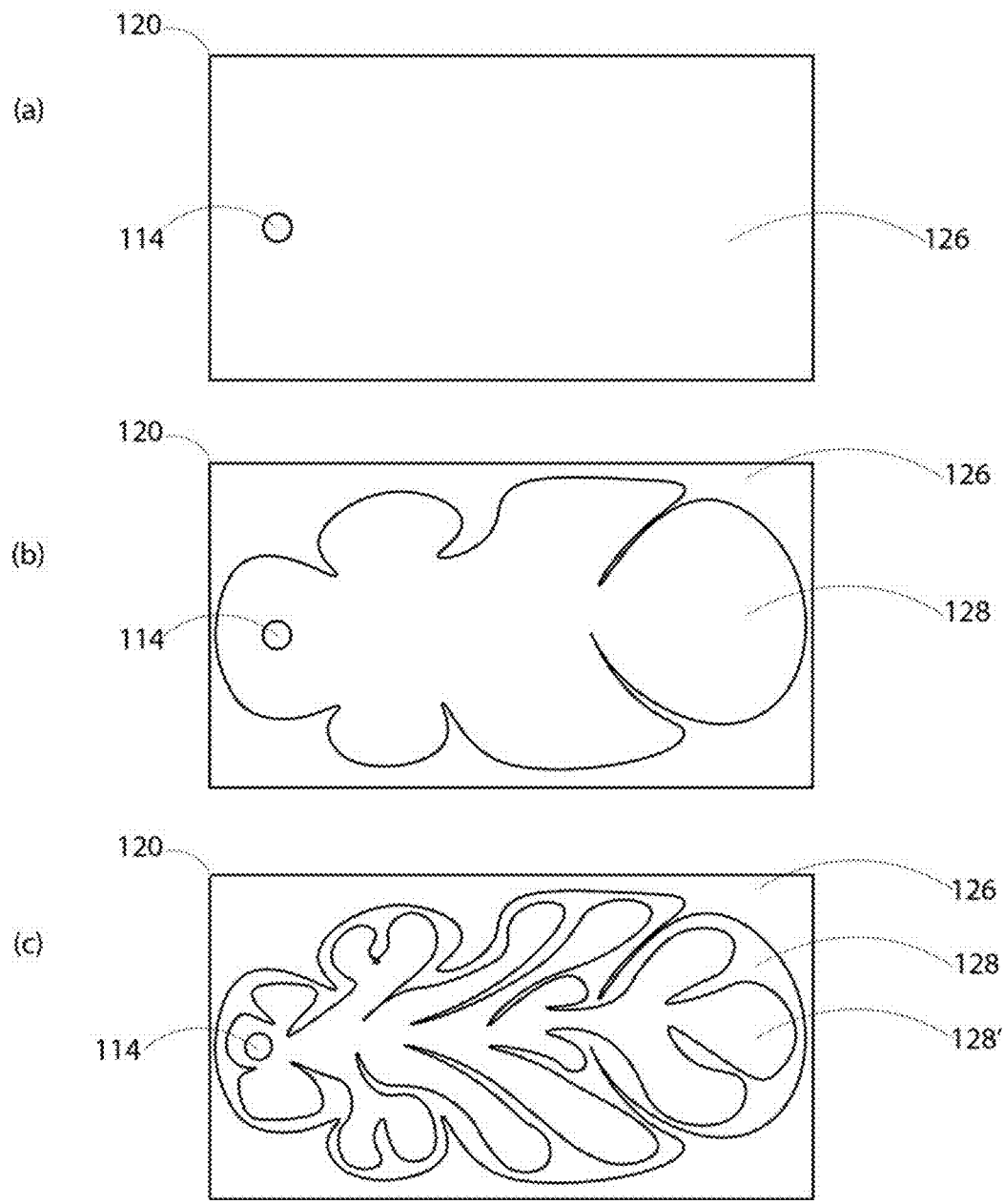
FIG. 13 illustrates a method to create nested channels.

The system has now gone through one cycle of the process of controlled branched channel growth. Additional channel growth may also be desired, and this can be achieved with further iterations of the injection process. A guest fluid 128 in the first iteration may become a host fluid 126 to a second iteration of fluid injection. This technique can provide nesting of branched channels, as depicted in FIG. 13. FIG. 13 illustrates three sequential injections of progressively less viscous fluids. In (a) the host fluid 126 fills the cell 120. In (b) branched channels have grown in a first iteration of guest fluid 128 injection. In (c) the guest fluid 128 of the first iteration (b) become host fluid 126 for a least viscous guest fluid 128'.

In FIG. 14(a), guest fluid 128 has been injected into host fluid 126 to produce branched channel growth. In (b), the host fluid 126 has partially cured—increasing its viscosity and a second injection of the same guest fluid 128 as in (a) has been applied. Finer branching results as the relative viscosity increase from (a) to (b).

As the fluids (126/128) begin to set, their viscosities increase. This can be taken advantage of through a secondary injection of guest 128 fluids. The secondary injection will add smaller branching channels to the already entrenched channels, as in FIG. 14. Additional volume may be required to accommodate new injections. This can be accomplished by changing the height of the boundary 112, changing the position of the boundary 112, increasing pressure, changing the physical characteristics of the sheets 110 (e.g. by heating), opening sources/sinks 114 for drainage, etc.

Setting

Once the channel growth is complete, the system should be sealed by preventing flow through sources/sinks 114 by means of valves 116 or some equivalent. The host 126 and/or guest 128 fluids should be allowed to set.

Temperature/UV Light Exposure/Time

Setting the material may involve applying a desired temperature and/or UV light to the system, and/or waiting a specified amount of time. If UV lights are used in the curing process, at least one of the sheets 110 should be UV transparent.

Changes in Physical Chemical Properties During Setting

Figure 14:
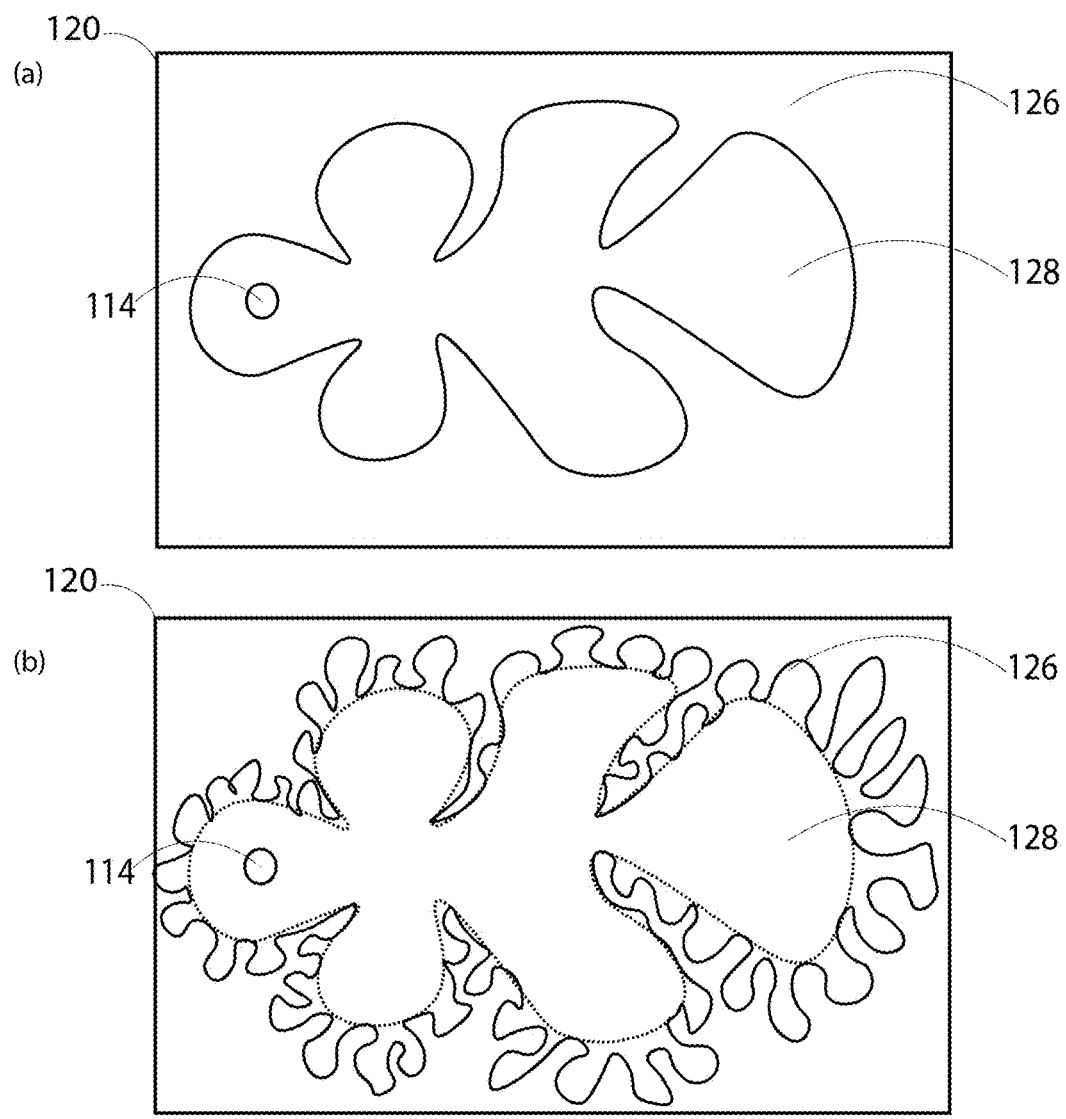
FIG. 14 illustrates two sequential injections of less viscous guest fluid.

The time for the materials to set varies greatly. A change in viscosity may subsequently be used for further injection of a secondary host 126 or guest 128 fluid. For example, often during the setting process, materials increase in viscosity. The increased viscosity of either host 126 and/or guest 128 fluid may allow for a subsequent injection iteration 938, whereby a secondary host 126 or guest 128 fluid enters the cell 120. This can be used to produce additional levels of hierarchy in the branching systems, as depicted in FIG. 14.

Several possibilities for setting are hereby described. After the host fluid 126 solidifies, the guest fluid 126 is removed. What remains is a solid matrix of material in the shape of the cell 120, with internal hollow branched channels incorporated into the structure. As an alternative, the guest fluid 128 solidifies and the host fluid 126 is removed. What remains is a solid matrix in the shape of branches generally conforming to the shape of the cell 120. Another possibility provides for the interface between host fluid 128 and guest fluid 126 to solidify. What remains is a hollow branching tube network generally conforming to the shape of the cell 120. It is also possible that both guest fluid 128 and host fluid 126 solidify, this creates an interlocked connection of the materials. Finally, it may also be desirable that neither fluid solidifies, so that the process is reproducible and ever evolving branching shapes are produced. This may be implemented for example, in an adaptive heating or cooling system.

Once the system has fully set and/or cured to the desired physical characteristics the branched structures are ready to be removed.

Removal

After the fluids have set, the system can now be disassembled. Carefully removing the sheets from each other will expose the branching structure.

EXAMPLE 2

Figure 2:
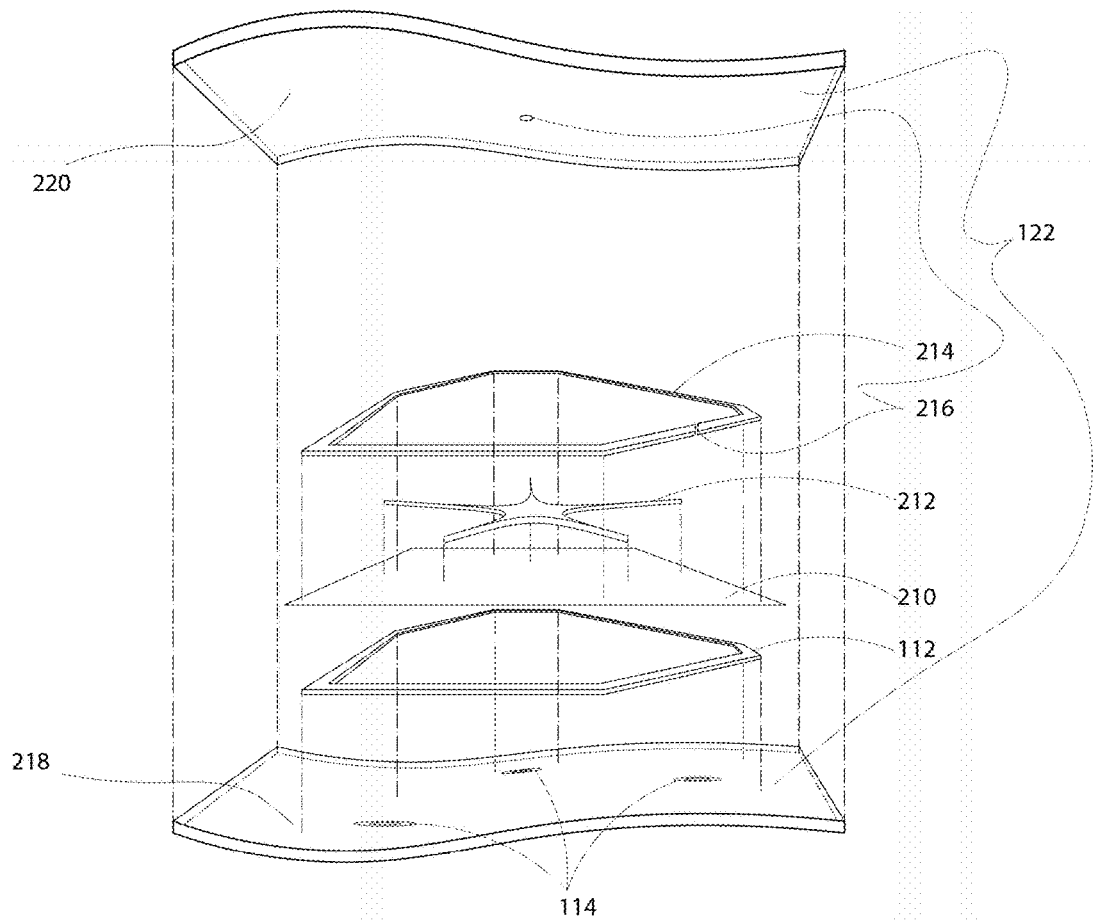
FIG. 2 is an exploded view of a second embodiment of a system for producing branched channel structures.

FIG. 2 illustrates a second embodiment where a film 210, boundary 112, and bottom sheet 218 combine to create an enclosed cell 120. A stencil 212 can be applied to the film 210 to produce an indentation on the cell 120 and displace host fluid (not shown). A spacer 214 can be used to provide additional volume for the cell 120 to expand into. Air purges 216 allow for air to flow out of the space above the film 210 during cell 120 expansion. The top sheet 220 provides constraint against the expansion of the cell 120, limiting expansion once the film 210 contacts the surface 122 of the top sheet 220.

Arrangements:

Bottom Sheet

The bottom sheet 218 allows for the same range in characteristics as provided for in the sheets 110 of the first embodiment.

Top Sheet

The top sheet 220 in this embodiment allows for a greater range in characteristics, which includes but is not limited to those provided for in the sheets 110 of the first embodiment. One ramification of this embodiment is that the top sheet 220 can be replaced with a body part, or other contoured surface 122 that is desired to be molded. Another ramification is that the top sheet 220 may also have pores or holes or channels in its surface 122 to act as an air purge 216. The top sheet 220 may also be comprised of larger holes and gaps, be made mesh (as illustrated in FIG. 8(g)), be made of strings, be made of pillars or protrusions, having a surface 122 of contact with the film 210 that constrains the inflation of the cell 120, but does not need to seal the cell 120 from leaks. The presence of the film 210 seals the cell 120. This allows for a wider range of geometries for the surface 122 of the top sheet 220, as the film 210 provides a seal against internal pressure in the cell 120.

The Cell

The cell 120 is now defined as the space between the bottom sheet 218 and the film 210 enclosed on the sides by the boundary 112. The cell 120 is essentially unchanged in this embodiment. It is dynamic, as before, in that the gap height 124 varies throughout the process. During the injection of the guest fluid 128 the cell 120 grows until the film 210 meets the top sheet 220 and/or stencil 211.

Film

A film, membrane, skin, or laminate 210 is fixed into contact with the boundary 112. The cell 120 is defined by one sheet 110, the boundary 112, and the film 210. The film 210 is stretched smoothly and evenly over the boundary 110 to remove slack and wrinkles.

Stencil

Figure 10:
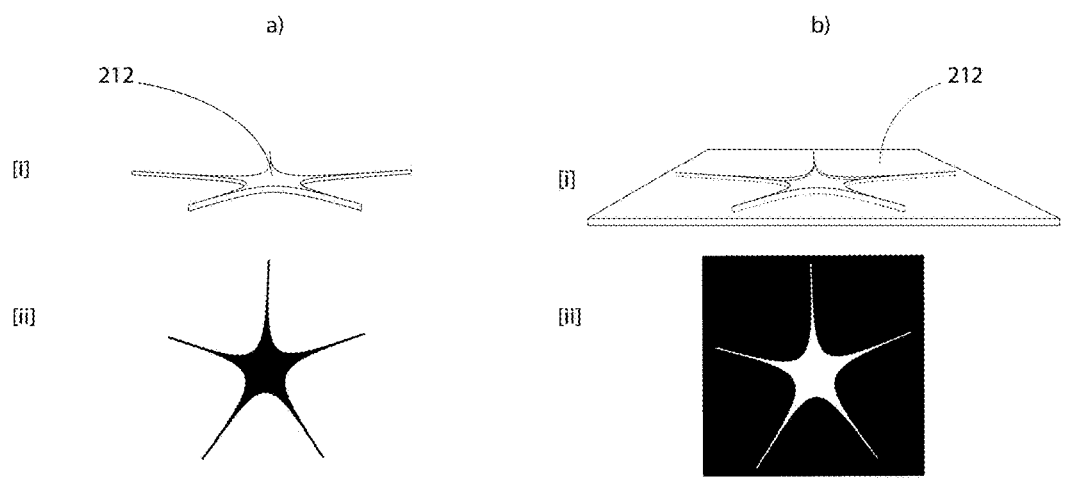
FIG. 10 illustrates various embodiments of stencils and their use.

The stencil 212 is a material object arranged in a design that is desired for the branched channels to grow into. It is able to leave an indent in the host fluid 126 by the stencil 212 being pressed against the film 210. FIG. 10(a)$_L$(b) illustrates stencils and their impressions. The two star-shaped stencils 212, one of positive star shape (FIG. 10(a[i])) the other of negative star shape, (FIG. 10(b[i])) are shown. The corresponding impressions left by each stencil is depicted in black in FIG. 10(a[i])) and (FIG. 10(b[ii])), for clarity. The stencil 212 can be applied to the film 210 by sandwiching the stencil 212 between the film 210 and the top sheet 220. This should be done after the host fluid 126 has filled the cell 120. Sufficient force can be applied by pressing the top sheet 220 toward the bottom sheet 218. This can be accomplished using weight, while the bottom sheet 218 is supported, or by clamping the sheets together, or by other means. The stencil 212 can also be applied simply by stamping it into the film 210 after filling the cell 120 with host fluid 126.

Spacer

The spacer 214 is a means of creating space between the film 210 and the top sheet 220. It may be made of a strip of high-density foam and can be arranged to follow the boundary 112 closely. The boundary 112 and the spacer 214 do not directly come into contact with one another as the film 210 is sandwiched in between. The spacer 214 may be equipped with a means of venting air, such as an air purge 216. The spacer 214 can be built into the top sheet 220 or can be independent of the top sheet 220. The spacer 214 can be used in conjunction with or independent of the stencil 212.

Air Purge

Air purge 216 is incorporated as a passageway in the spacer 214 for air to vent through. It may also be incorporated into the top sheet 220.

Functions:

Bottom Sheet

The bottom sheet 218 allows for the same range in function as provided for in the sheets 110 of the first embodiment. The surface 122 of the bottom sheet 218 may constitute any number of the same features as provided for in the surfaces 122 of the sheets 110 in the first embodiment.

Top Sheet

The top sheet in this embodiment fulfills the same function as in the sheets 110 in the previous embodiment, however the top sheet 220 may not come into direct contact with the host 126 and/or guest 128 fluids. The surface 122 of the top sheet 220 may constitute any number of the same features as provided for in the surfaces 122 of the sheets 110 in the first embodiment. The top sheet 220 constrains the cell 120 during injection by limiting the inflation of the cell 120. The use of a film 210 in this embodiment allows for the top sheet 220 to have gaps and holes. The top sheet 220 can be made of a mesh, or net of strings, as illustrated in FIG. 8g. The implementation of deeper grooves, shown in FIG. 8d, f, also allows for the guidance and growth of larger channels. In this embodiment deep grooves also aid in reconnecting branched channels, which is of a great benefit because it can allow for the channels to converge. FIG. 8d illustrates one possible configuration of deep grooves in surface 122 that guides channel growth to both diverge and converge.

The Cell

The cell 120 is defined as the space between the bottom sheet 218, the boundary 112, and the film 210. The function of the cell 120 is unchanged from the first embodiment. However, the volume of the cell 120 is now more easily changed due to the mutability of the film 210. The gap height 124 of the cell 120 changes during injection as the cell 120 inflates with fluids and the film 210 moves upward to make contact with the top sheet 220. The gap height 124 is at its maximum where the film 210 meets the surface 122 of the top sheet 220.

Film

The film 210 functions as a barrier between the fluids and the top sheet 220. It allows for easy manipulation of the host fluid 126. The host fluid 126 can now be easily redistributed throughout the cell 120 with the aid of a rolling pin or cloth or by hand or by stencil 212 or other means, without contacting the fluid directly. This enables easier filling of the cell 120, and the ability to impress intricate shapes into the cell 120.

Stencil

In sufficiently viscous host fluids 126 an indentation left by a stencil 212 can be used to guide channel growth into desired stencil 212 shapes. The indentation left by the stencil 212 creates a path of least resistance for branched channel growth. The stencil 212 may be broad or narrow, and may contain intricate details, and the channels may grow to fill the indentation partially, completely, or to branch beyond the indentation.

Spacer

The spacer 214 is used to create additional volume into which the guest fluid 128 can expand. The spacer increases the maximum gap height 124 by resting on top of the boundary 112 and separating the top sheet 220 from the film 210. The spacer 214 is also used to apply pressure to the film 210 along the boundary 112. The spacer 214 helps maintain a good seal within the cell 120 and helps prevent unwanted leaks.

Air Purge

The air purge 216 allows air to flow freely out of the space between the top sheet 220, the spacer 214 and the film 210. If the air purge 216 were not there, this space runs the risk of being air tight. When guest fluid 128 is injected, the air within this space will become compressed. When the pressure of the space reaches the pressure of the guest fluid 128, all growth will stop. Without an air purge the pressure in the system may exceed the structural design of the system, causing blow-out leaks.

DETAILED OPERATION-Second Embodiment

Assembling the System

As depicted in FIG. 2 and FIG. 9, the layout options of the system in the first embodiment apply to this embodiment. However, sources/sinks 114 are on the bottom sheet 218, or in the boundary 114, as sources/sinks 114 placed in the top sheet 220 would not have access to the cell 120.

Thin Film Placement

The cell 120 and fluids (126 and 128) will be contained between the bottom sheet 218, the film 210 and the boundary 112. The top sheet will provide additional constraint on the cell 120 during various stages of fluid injection. The film 210 is applied after boundary 112 arrangement 918, and before host fluid 126 injection 926.

Injecting Fluids

Host Fluid Injection

Injection of host fluids 126 follows the same procedure as in the first embodiment. As in the first embodiment, deformation of the cell 120 deforms the body of host fluid 126. The cell 120 is covered by a film 210, so pressure applied to the film 210 translates to motion/deformation of the host fluid 126 underneath. In this embodiment, great levels of deformation are possible, because the film 210 allows for greater mutability than most sheets 110. The high viscosity of the host fluid 126 preserves deformations or impressions left in the body of host fluid 126. Thus the stencil 212 may be applied to the film 210 under force to displace host fluid 126 within the cell 120 and produce a designed indentation.

Stencil Application

The stencil 212 can be applied to the film 210 by sandwiching the stencil 212 between the film 210 and the top sheet 220. This should be done after the host fluid 126 has filled the cell 120. Sufficient force can be applied by pressing the top sheet 220 toward the bottom sheet 218 without the placement of the spacer 214. The compression can be accomplished using weight, while the bottom sheet 218 is supported, or by clamping the sheets together, or by any other means. This process should be applied first without the stencil 212 to create a uniform and smooth distribution of host fluid 126, and then with the stencil 212 to produce the indentation. The host fluid 126 will need to drain from the cell 120 during this process, so leaving a valve 116 open while applying pressure to the stencil 212 is important. Closing the valves 116 after sufficiently compressing the stencil 212 into the film 210 and underlying host fluid 126 will preserve the desired indentation. The stencil 212 can also be applied by stamping it into the film 210 after filling the cell 120 with host fluid 126. The stencil 212 can also be left on the cell and pressed between the film 210 or balloon 610 and the top sheet 220. This can be done to help apply the stencil to deform the host fluid 128. The stencil 212 can also be left in during guest fluid 128 injection 936. If the stencil 212 is left in, channel growth may avoid the area the stencil 212 occupies. This due to the fact that the stencil 212 indentation becomes a zone of high pressure, comparable to the boundary 112, where channel growth avoids. The channel growth will occur primarily outside the imprinted area of the stencil 212.

Spacer Application

Applying the spacer 214 is done to create additional volume for the cell 120. The spacer raises the top sheet 220 from the film 210. This is especially useful in rigid sheet 110 systems as a way of controlling growth and accommodating guest fluid 128 injection at lower pressures. The spacer 214 is supported by the boundary 112, and follows the boundary 112 closely. When pressure is applied to the spacer 214, it helps to pin the film 210 to the boundary 112, and ensures a tight seal of the cell 120. Stencils 212 left inside the system during guest fluid 128 injection 936 can also function as spacers 214. To prevent excessive compression of air between the film 210 (or balloon 610; see third embodiment), spacer 214, and the top sheet 220, an air purge 216 is introduced. An air purge 216 can be added to the spacer 214 or top sheet 220 to allow for air to escape when guest fluid 128 is injected 936 and the void above the film 210 shrinks.

Criteria for use of the spacer
1. If the branched channel structure is intended to grow beyond the boundaries of the stencil 212:
   a. And If the top sheet 220 and bottom sheet 218 combined have sufficient deformability
      i. No spacer is required.
   b. And If the top sheet 220 and bottom sheet 218 combined have limited deformability
      i. A spacer is required
2. If the branched channel structure is intended to grow only within the boundaries of the stencil 212:
   a. The top sheet 220 and bottom sheet 218 combined should be rigid
      i. No spacer 214 is required
3. If no stencil 212 is used, and the branches are desired to grow throughout the cell
   a. If the top sheet 220 and bottom sheet 218 combined have sufficient deformability
      i. No spacer is required—this is the first embodiment
   b. If the top sheet 220 and bottom sheet 218 combined are rigid
      i. A spacer is required OR sufficient pressure and host fluid 126 flow within the cell 120 is required
4. If the stencil 212 is left in during guest fluid 128 injection 936:
   a. A spacer allows for the negative space of the stencil to be the space in which the channels grow.

Host fluid 126 flow within a rigid cell 120 with no spacer 214 requires applying higher pressure during injection of guest fluid 128 because of the high resistance to flow caused by the high viscosity of the host fluid 126 and small gap height 124. The addition of a spacer 214 and/or use of a stencil 214 will reduce the operating pressure of the cell 120.

Top Sheet Application

The top sheet 220 is applied to close the system and constrain the cell 120. The top sheet 220 is fixed in place to provide the desired constraint against the expansion of the cell 120. This may be achieved by clamps or any equivalent means.

Guest Fluid Injection

After the stencil 212 has been applied (930), the system is constrained by the top sheet 220. The guest fluid 128 should be prepared and ready to be injected. Guest fluid 128 injection 936 proceeds as in the first embodiment. Multiple cycles of injection of host 126 and/or guest 128 fluids can proceed as in the first embodiment. Additional volume may be required to accommodate new injections. This can be accomplished by changing the height of the spacer 214 or boundary 112, changing the position of the boundary 112, removing stencils 211, increasing pressure, changing the physical characteristic of the sheets 110 or top sheet 220 or bottom sheet 218 (e.g. by heating), opening sources/sinks 114 for drainage, etc.

Setting

The setting is the same as described in the first embodiment.

Removal

The top sheet 220 should be carefully removed from the bottom sheet 218. The film 210 should be removed to expose the cured matrix of branched channels. The branched channels can now be removed from the cell 120.

EXAMPLE 3

Figure 6:
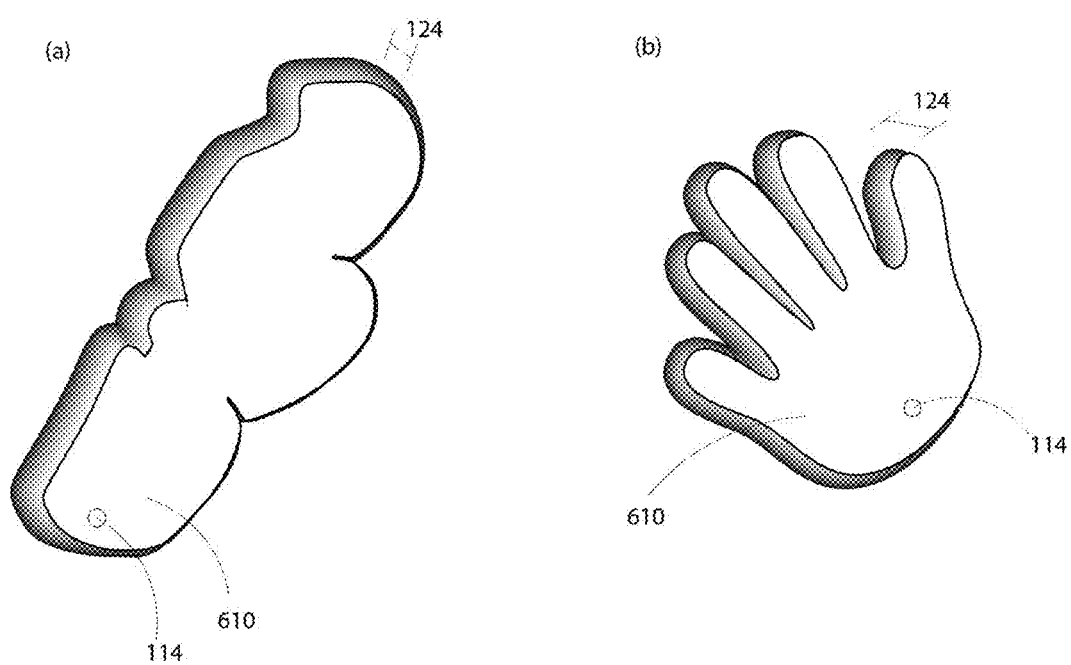
FIG. 6 illustrates two embodiments of balloons in the shape of either a leg wrap or a hand.

FIG. 6 illustrates two examples of balloons 610 in the shape of a leg wrap, and a hand. The gap height 124 is the distance along the shortest path between opposing sides of the balloon 610. Sources, sinks, or ports 114 are incorporated in the envelope of the balloon 610. The balloons 610 replace the need for the film 210 in the second embodiment. This allows for greater versatility in selecting bottom 218 and top 220 sheets.

Arrangements:

The Cell

The cell 120 is defined as the space within the balloon. The cell 120 is dynamic, as in the first and second embodiments. The gap height 124 can vary as fluids are injected into and out of the cell 120, and is defined as the height of the balloon 610, as depicted in FIG. 6.

Bottom Sheet

The bottom sheet 218 allows for the same range in characteristics as provided for in the top sheet 220 of the second embodiment.

Top Sheet

The top sheet is arranged in the same way and with the same range in physical characteristics as in the second embodiments. It may be cast to conform to the shape of the bottom sheet 218 to assist in creating a quasi-two dimensional space around a custom surface (e.g. the human leg).

Balloons

Balloons 610 are a deformable vessel or cavity into which the host 126 and guest 128 fluids are injected. They can be made into any shape. A glove, as depicted in FIG. 6(*b*), is an example of a balloon 610 in the shape of a hand. Balloons 610 are sandwiched between the surfaces 122 of the top sheet 220 and bottom sheet 118. The rigid face of either or both of top sheet 220 and bottom sheet 218 may be incorporated into the balloon design. The balloons 610 have source(s)/sink(s) 114 incorporated into their envelope.

Functions:

The Cell

The cell's function remains the same as in the second embodiment.

Bottom Sheet

The bottom sheet 218 provides the same function as the top sheet 220 in the second embodiment. The balloon 610 allows a new freedom of forming the cell 120 directly on a flat or contoured surface as desired. For example, the balloon 620 could be formed directly on a person's leg, whereby the leg then functions as the bottom sheet 218.

Top Sheet

The function of the top sheet 220 is the same as in the second embodiment. Holes in the top sheet 220 can be incorporated in the same layout as the sources/sinks 114 of the balloon 610 to allow hoses to access the sources/sinks 114.

Balloons

The envelope of the balloon 610 provides the airtight environment for fluids to be injected into. The inside of the balloon 610 constitutes the cell 120. The structure of the balloon 610 contributes to the overall form of the resulting branched channel system. For example, FIG. 6 (b) illustrates a hand shaped balloon 610. This will produce a branched system with a hand shaped envelope. A sealed rubber glove is an example of a balloon 610 with a hand shaped envelope. The balloon 610 should have at least one source/sink 114 to allow for controlled fluid access to the cell space 120.

Assembling

Figure 3:
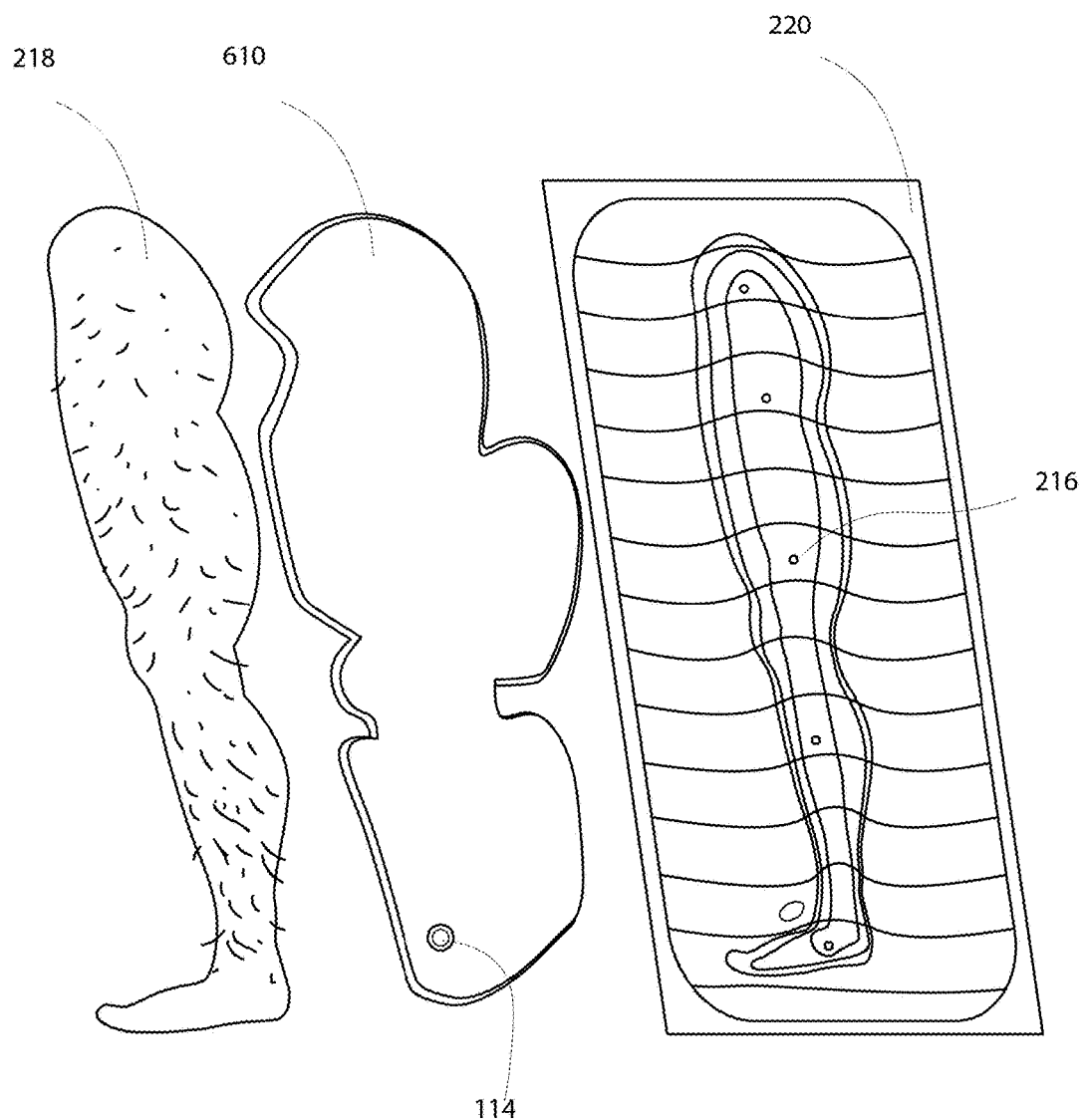
FIG. 3 is a perspective view of a third embodiment of a system for producing branched channel structures cast around a leg.

FIG. 3 illustrates the third embodiment where a balloon 610 is sandwiched between a human leg functioning as the bottom sheet 218 and a form-fitting top sheet 220. A source, sink, or port 114 is incorporated into the envelope of the balloon 610 to allow for controlled fluid access. Air purge holes 216 in the top sheet 220 allow air to move freely as the balloon 610 inflates.

The cell 120 is defined as the space within the balloon 610. The cell 120 is dynamic, as in the first and second embodiments. The gap height 124 can vary as fluids are injected into and out of the cell 120. The envelope of the balloon 610 may also change under internally or externally applied pressure.

The balloon 610 may be applied to a contoured surface, so that said surface acts as the bottom sheet 218. For example, the balloon 610 may be applied to the leg of a person so the balloon 610 conforms to the contour of the leg, and the leg acts as a constraining support, as depicted in FIG. 3.

As in the second embodiment, a stencil 212 may be used.
The stencil 212 should be applied to add an impression to the balloon 610, just as in the second embodiment.
The top sheet 220 can be made to conform to the bottom sheet 218 to create a quasi-two dimensional space. The top sheet 220 should be secured to provide constraint against the expansion of the balloon 610.

Injecting Fluids

Fluids are injected through ports in the same fashion as in previous embodiments.

Setting

Setting is performed in the same was as in previous embodiments.

Removal

Removal is performed by separating the top 220 and bottom 218 sheets. The balloon 610 contains the solidified matrix of branched channels. This matrix may be left in the balloon 610 or removed by cutting or opening the balloon 610, as desired.

What is claimed is:

1. A system for forming branched structures, the system comprising:
a first sheet having an inner surface and an outer surface;
a second sheet having an inner surface and an outer surface;
a deformable film intermediate the first sheet and the second sheet;
a boundary sealed between the second sheet and the deformable film;
wherein the boundary is configured to remain fixed under either positive or negative pressure in the outline of an article while sealed between the second sheet and the deformable film thereby to form a constrained cell space, the first and second sheets having sufficient rigidity to together maintain a desired gap height of and across the constrained cell space under either positive or negative pressure; and
at least one inlet port in fluid communication with the constrained cell space for controllably conveying fluid into or out of the constrained cell space.

2. The system of claim 1, further comprising:
a spacer between the deformable film and the first sheet.

3. The system of claim 1, further comprising:
a stencil between the deformable film and the first sheet.

4. The system of claim 1, wherein at least one of the first sheet and the second sheet is contoured, multifaceted, grooved or textured.

5. The system of claim 1, wherein a host fluid is within the constrained cell space under either a positive or negative pressure.

6. A system for forming branched structures, the system comprising:
a first sheet having an inner surface and an outer surface;
a second sheet having an inner surface and an outer surface;
a boundary between and sealed to the first sheet inner surface and the second sheet inner surface, the boundary configured to remain fixed under either positive or negative pressure in the outline of an article while sealed between the first sheet and the second sheet thereby to form a constrained cell space, the boundary having a thickness and the first and second sheets having sufficient rigidity to together maintain a desired gap height of and across the constrained cell space under either positive or negative pressure;
a host fluid within the constrained cell space;
a source of guest fluid, the guest fluid having a viscosity lower than the viscosity of the host fluid, wherein at least one of the host fluid and the guest fluid can solidify;
at least one port in fluid communication with the cell space; and
an injection device associated with the at least one port and the source of guest fluid, the injection device controllable to inject the guest fluid via the at least one port into and against the pressure of the host fluid within the constrained cell space thereby to form branched structures within the host fluid prior to solidifying,
wherein the ratio of the desired gap height to the width of the constrained cell space is constrained by:

$$\frac{b}{\text{width}} \leq \frac{1}{2\pi \sqrt{\frac{\sigma}{\mu V}}}$$

wherein:
width is distance across the constrained cell space in a direction perpendicular to channels of the branched structures;
b is the desired gap height;
σ is the interfacial tensions between host and guest fluids;

μ is the difference between the viscosities of the host and guest fluids; and

V is the velocity of the interface between the host and guest fluids.

7. The system of claim 6, wherein at least one of the first sheet and the second sheet is contoured, multifaceted, grooved or textured.

8. The system of claim 6, wherein the host fluid is within the constrained cell space under either a positive or negative pressure.

9. A system for forming branched structures, the system comprising:

a first sheet having an inner surface and an outer surface;

a second sheet having an inner surface and an outer surface;

a balloon intermediate the first sheet and the second sheet to form therewithin a constrained cell space, the balloon configured to, when urged to a shaped condition under pressure, hold a fluid that forms an article within the balloon to the shaped condition, and be in contact with only the first and second sheets, the first and second sheets having sufficient rigidity to together maintain a desired gap height of and across the constrained cell space under either positive or negative pressure thereby to constrain the shaped condition of the balloon in the shape of the article; and at least one inlet port in fluid communication with the constrained cell space for controllably conveying fluid into or out of the constrained cell space.

10. The system of claim 9, wherein the balloon is contoured.

11. The system of claim 9, wherein at least one of the first sheet and the second sheet is contoured, multifaceted, grooved or textured.

12. The system of claim 9, further comprising:

a spacer between the balloon and at least one of the first and second sheets.

13. The system of claim 9, further comprising:

a stencil between the balloon and at least one of the first and second sheets.

14. The system of claim 9, wherein at least one of the first sheet and the second sheet is contoured, multifaceted, grooved or textured.

* * * * *